United States Patent
Asakawa et al.

(10) Patent No.: US 11,276,878 B2
(45) Date of Patent: Mar. 15, 2022

(54) ANODE FOR LITHIUM ION SECONDARY BATTERY AND LITHIUM ION SECONDARY BATTERY

(71) Applicants: MURATA MANUFACTURING CO., LTD., Kyoto (JP); Hydro-Quebec, Montreal (CA)

(72) Inventors: Yuichiro Asakawa, Tokyo (JP); Shinichi Uesaka, Tokyo (JP); Antoine Lafleur-Lambert, Quebec (CA); Karim Zaghib, Quebec (CA)

(73) Assignee: Murata Manufacturing Co., Ltd., Kyoto (JP)

(*) Notice: Subject to any disclaimer, the term of this patent is extended or adjusted under 35 U.S.C. 154(b) by 320 days.

(21) Appl. No.: 16/664,445

(22) Filed: Oct. 25, 2019

(65) Prior Publication Data

US 2020/0058955 A1    Feb. 20, 2020

Related U.S. Application Data

(63) Continuation of application No. PCT/JP2018/017263, filed on Apr. 27, 2018.
(Continued)

(51) Int. Cl.
*H01M 10/0525* (2010.01)
*H01M 4/60* (2006.01)
*C07F 5/06* (2006.01)
*C07F 7/02* (2006.01)
*C07F 7/22* (2006.01)
(Continued)

(52) U.S. Cl.
CPC ......... *H01M 10/0525* (2013.01); *C07F 5/069* (2013.01); *C07F 7/025* (2013.01); *C07F 7/22* (2013.01); *C07F 13/005* (2013.01); *C07F 15/025* (2013.01); *C07F 15/045* (2013.01); *C07F 15/065* (2013.01);
(Continued)

(58) Field of Classification Search
CPC .................................................. H01M 10/0525
See application file for complete search history.

(56) References Cited

U.S. PATENT DOCUMENTS

| | | | | |
|---|---|---|---|---|
| 5,824,434 A | * | 10/1998 | Kawakami | H01M 4/38 |
| | | | | 429/209 |
| 6,207,326 B1 | * | 3/2001 | Kawakami | H01M 4/366 |
| | | | | 429/231.95 |

(Continued)

FOREIGN PATENT DOCUMENTS

| | | |
|---|---|---|
| JP | 2008112630 A | 5/2008 |
| JP | 2008524778 A | 7/2008 |

(Continued)

OTHER PUBLICATIONS

Japanese Office Action dated Jul. 28, 2020, in corresponding Japanese Application No. 2019-515725.
(Continued)

*Primary Examiner* — Ula C Ruddock
*Assistant Examiner* — Thomas H. Parsons
(74) *Attorney, Agent, or Firm* — K&L Gates LLP

(57) ABSTRACT

A lithium ion secondary battery includes a cathode, an anode, and an electrolytic solution. The anode includes a cyclic compound and the cyclic compound includes one or more of a first cyclic compound, a second cyclic compound, and a third cyclic compound.

7 Claims, 5 Drawing Sheets

Related U.S. Application Data

(60) Provisional application No. 62/492,657, filed on May 1, 2017.

(51) Int. Cl.
*C07F 13/00* (2006.01)
*C07F 15/02* (2006.01)
*C07F 15/04* (2006.01)
*C07F 15/06* (2006.01)
*H01M 10/0567* (2010.01)

(52) U.S. Cl.
CPC ....... *H01M 4/604* (2013.01); *H01M 10/0567* (2013.01); *H01M 2300/0025* (2013.01)

(56) References Cited

U.S. PATENT DOCUMENTS

| | | | | |
|---|---|---|---|---|
| 6,391,492 | B1* | 5/2002 | Kawakami | H01M 4/48 429/209 |
| 6,395,423 | B1* | 5/2002 | Kawakami | H01M 4/02 429/215 |
| 7,081,320 | B2* | 7/2006 | Kawakami | H01M 4/366 429/232 |
| 2002/0031701 | A1* | 3/2002 | Kawakami | H01M 4/13 429/137 |
| 2007/0180688 | A1* | 8/2007 | Kawakami | H01M 4/131 29/623.1 |
| 2008/0300381 | A1 | 12/2008 | Uchi et al. | |
| 2014/0356708 | A1 | 12/2014 | Arikawa et al. | |

FOREIGN PATENT DOCUMENTS

| | | |
|---|---|---|
| JP | 2014139909 A | 7/2014 |
| WO | 2011/129053 | 10/2011 |

OTHER PUBLICATIONS

European Search Report dated Mar. 15, 2021 in corresponding European Application No. 18793856.8.

Sartaj Tabassum et al., "Synthesis of new heterometallic macromolecules: Their DNA binding, cleavage activity and in vitro model electrochemotherapy study", Spectrochimica Acta Part A, vol. 74, pp. 1152-1159, 2009.

Cakil Erk, "Oligomeric cyclic esters from oxaalkanedicarboxylic acids and oxaalkanediols, 3a), Formations of macrocyclic oligo(ether-ester)s", Makromol. Chem., Rapid Commun., vol. 5, pp. 275-279, 1984.

J.E. Sangeetha et al., "Template Synthesis of Transition Metal Complexes with Octaamide Macrocyclic Ligand", Asian Journal of Chemistry, vol. 20, No. 4, pp. 2673-2678, 2008.

International Search Report for Application No. PCT/JP2018/017263, dated Jul. 10, 2018.

European Search Report dated Nov. 27, 2020 in corresponding European Application No. 18793960.8.

* cited by examiner

ANODE FOR LITHIUM ION SECONDARY BATTERY AND LITHIUM ION SECONDARY BATTERY

CROSS REFERENCE TO RELATED APPLICATIONS

The present application is a continuation of PCT patent application no. PCT/JP2018/017263, filed on Apr. 27, 2018, which claims priority to U.S. provisional patent application No. 62/492,657 filed on May 1, 2017, the entire contents of which are being incorporated herein by reference.

BACKGROUND

The present technology generally relates to an anode, for a lithium ion secondary battery, used in a lithium ion secondary battery, and a lithium ion secondary battery provided with the anode for a lithium ion secondary battery.

As a result of widespread use of various electronic apparatuses, development of a lithium ion secondary battery, as a power source, which is small in size, light in weight, and capable of obtaining a high energy density has been promoted.

A lithium ion secondary battery includes an electrolytic solution together with a cathode and an anode. The anode contains an anode active material, etc. which are related to a charge-discharge reaction. Since a configuration of the anode greatly influences a battery characteristic, various considerations have been given to the configuration of the anode.

Specifically, in order to suppress deterioration of a battery characteristic at a time of high temperature storage, an anode contains cyclic polyether, or cryptand. As the cyclic polyether, 4,10-diaza-12-crown 4-ether or the like is used.

SUMMARY

The present technology generally relates to an anode, for a lithium ion secondary battery, used in a lithium ion secondary battery, and a lithium ion secondary battery provided with the anode for a lithium ion secondary battery.

An electronic apparatus on which a lithium ion secondary battery is to be mounted is increasingly gaining higher performance and more functions. For this reason, frequency of use of an electronic apparatus is increasing, and a usage environment of the electronic apparatus is expanding. Therefore, there is still room for improvement in a battery characteristic of a lithium ion secondary battery.

The present technology has been made in view of the above problem, and an object thereof is to provide an anode for a lithium ion secondary battery and a lithium ion secondary battery that are capable of obtaining a superior battery characteristic.

An anode for a lithium ion secondary battery according to an embodiment of the present technology includes a cyclic compound, and the cyclic compound includes one or more of a first cyclic compound represented by the following formula (1), a second cyclic compound represented by the following formula (2), and a third cyclic compound represented by the following formula (3).

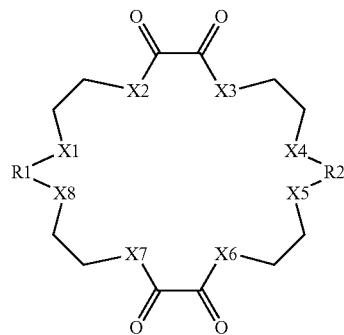

(1)

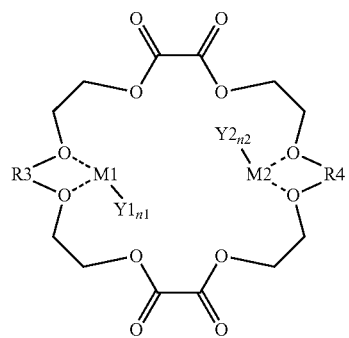

(2)

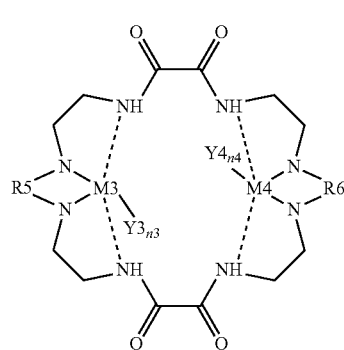

(3)

(Each of X1 to X8 includes one of an oxo group (—O—) and an imino group (—NH—). Each of R1 to R6 includes one of an ethylene group (—CH$_2$—CH$_2$—) and a dicarbonyl group (—C(=O)—C(=O)—). Each of M1 to M4 includes a metal element. Each of Y1 to Y4 is a halogen element. Each of n1 to n4 is an integer.)

A lithium ion secondary battery according to an embodiment of the present technology includes a cathode, an anode, and an electrolytic solution. The anode has a configuration similar to that of the anode for a lithium ion secondary battery according to the embodiments of the present technology described herein.

According to the anode for a lithium ion secondary battery or the lithium ion secondary battery of the present technology, since the anode includes the cyclic compound and the cyclic compound includes one or more of the first cyclic compound described above, the second cyclic compound described above, and the third cyclic compound described above, it is possible to obtain a superior battery characteristic.

It should be understood that effects of the present technology are not necessarily limited to the effects described here, and other suitable properties relating to the present technology may be realized and as further described.

DETAILED DESCRIPTION

The present disclosure will be described based on examples with reference to the drawings, but the present disclosure is not to be considered limited to the examples, and various numerical values and materials in the examples are considered by way of example. should be understood [0015] A lithium ion secondary battery according to an embodiment of the present technology will be described. It should be understood that, since an anode for a lithium ion secondary battery according to an embodiment of the present technology is a portion (one component) of the lithium ion secondary battery which will be described below, the anode for a lithium ion secondary battery will be also described below.

Hereinafter, the lithium ion secondary battery according to an embodiment of the present technology is simply referred to as a "lithium ion secondary battery", and the anode for a lithium ion secondary battery according to an embodiment of the present technology is simply referred to as an "anode."

The lithium ion secondary battery described here is, for example, a secondary battery in which a battery capacity (a capacity of an anode 22 which will be described later) is obtained by utilizing a phenomenon of insertion and extraction of lithium.

It should be understood that, as for a series of specific examples described below as appropriate, that is, as for a plurality of candidates of a material, a forming method, etc., only any one of them may be used, or any two or more of them may be combined with each other.

Figure 1:
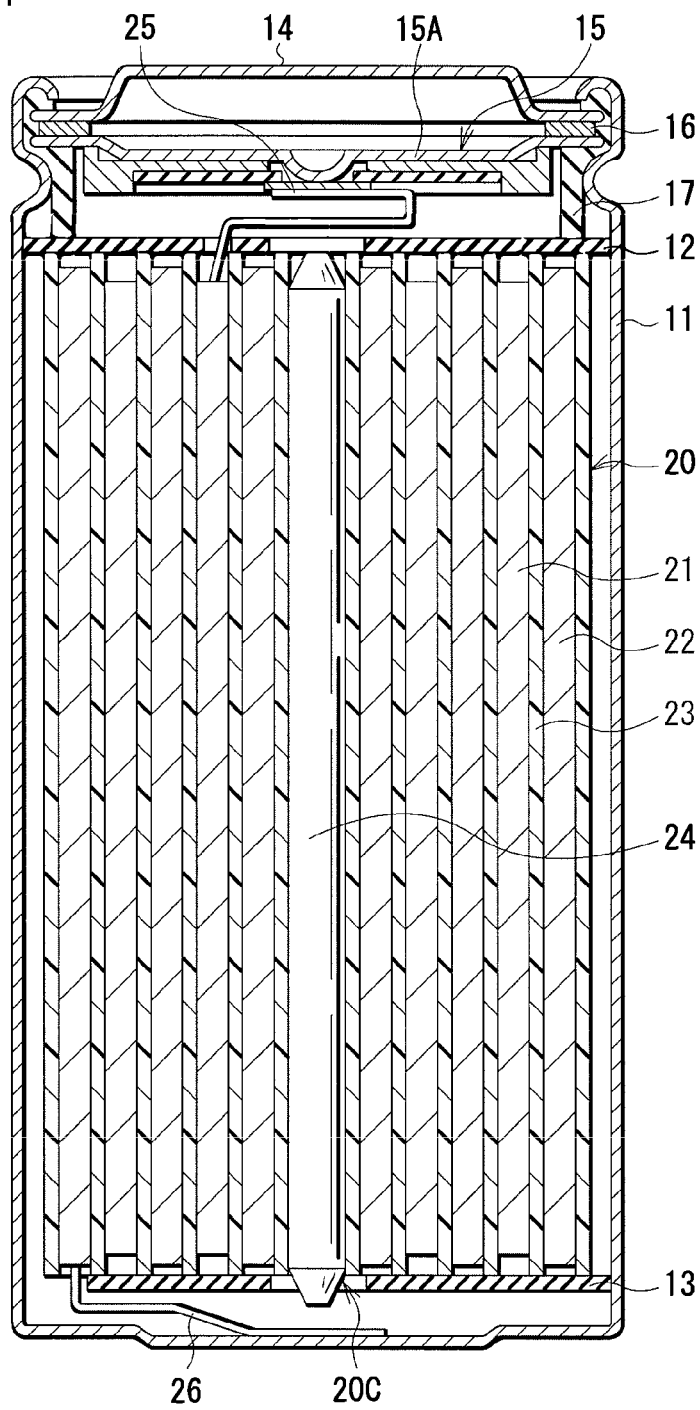
FIG. 1 is a cross-sectional view of a configuration of a lithium ion secondary battery (cylindrical type) according to an embodiment of the present technology.
Figure 2:
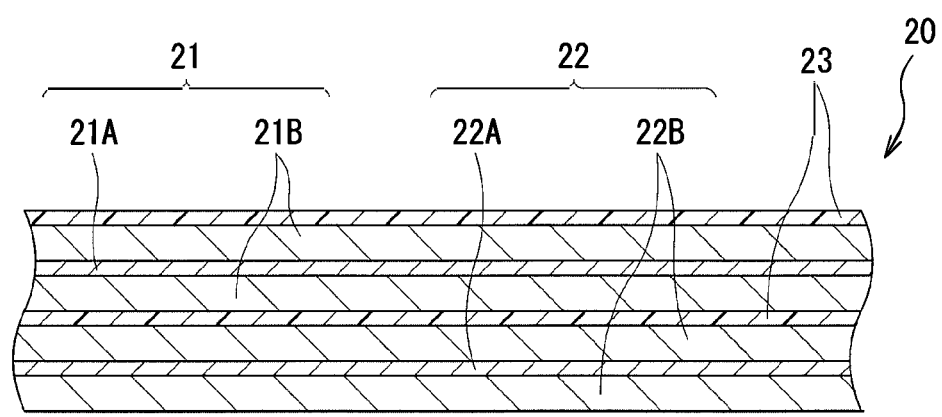
FIG. 2 is an enlarged cross-sectional view of a configuration of a main part of the lithium ion secondary battery illustrated in FIG. 1.

FIG. 1 illustrates a cross-sectional configuration of a lithium ion secondary battery, and FIG. 2 enlarges a cross-sectional configuration of a main part (spirally-wound electrode body 20) of the lithium ion secondary battery illustrated in FIG. 1. It should be understood that FIG. 2 illustrates only a portion of the spirally-wound electrode body 20.

As illustrated in FIG. 1, the lithium ion secondary battery is, for example, a cylindrical-type lithium ion secondary battery in which a battery device (the spirally-wound electrode body 20) is accommodated inside a cylindrical battery can 11.

Specifically, the lithium ion secondary battery includes, for example, a pair of insulating plates 12 and 13 and the spirally-wound electrode body 20 inside the battery can 11. The spirally-wound electrode body 20 is, for example, a structure formed by stacking a cathode 21 and an anode 22 with a separator 23 interposed therebetween and thereafter spirally winding the cathode 21, the anode 22, and the separator 23. The spirally-wound electrode body 20 is impregnated with an electrolytic solution which is a liquid electrolyte.

The battery can 11 has, for example, a hollow cylindrical structure in which one end is closed and the other end is opened. The battery can 11 includes, for example, a metal material such as iron. It should be understood that a surface of the battery can 11 may be plated with a metal material such as nickel, for example. The insulating plates 12 and 13 each extend, for example, in a direction intersecting a spirally-wound peripheral surface of the spirally-wound electrode body 20, and are so disposed as to sandwich the spirally-wound electrode body 20 therebetween.

At the open end of the battery can 11, for example, a battery cover 14, a safety valve mechanism 15, and a positive temperature coefficient device (PTC device) 16 are attached by being swaged with a gasket 17. The open end of the battery can 11 is therefore sealed. A material for forming the battery cover 14 is, for example, similar to a material for forming the battery can 11. The safety valve mechanism 15 and the positive temperature coefficient device 16 are provided on inner side of the battery cover 14. The safety valve mechanism 15 is electrically coupled to the battery cover 14 via the positive temperature coefficient device 16. In the safety valve mechanism 15, for example, when an internal pressure of the battery can 11 becomes equal to or higher than a predetermined value as a result of an internal short-circuit, external heating, etc., a disk plate 15A is reversed. The electrical coupling between the battery cover 14 and the spirally-wound electrode body 20 is thereby cut off. Electrical resistance of the positive temperature coefficient device 16 increases with an increase in temperature in order to prevent abnormal heat generation due to a large current. The gasket 17 includes, for example, an insulating material. It should be understood that, for example, asphalt, etc. may be applied to a surface of the gasket 17.

For example, a center pin 24 is inserted into a space 20C provided at a spirally-winding center of the spirally-wound electrode body 20. It should be understood that the center pin 24 may be omitted. A cathode lead 25 is coupled to the cathode 21. The cathode lead 25 includes, for example, an electrically-conductive material such as aluminum. The cathode lead 25 is electrically coupled to the battery cover 14 via the safety valve mechanism 15, for example. An anode lead 26 is coupled to the anode 22. The anode lead 26 includes, for example, an electrically-conductive material such as nickel. The anode lead 26 is electrically coupled to the battery can 11, for example.

As illustrated in FIG. 2, the cathode 21 includes, for example, a cathode current collector 21A and a cathode active material layer 21B provided on the cathode current collector 21A. The cathode active material layer 21B may be provided on, for example, only a single surface of the cathode current collector 21A, or may be provided on both surfaces of the cathode current collector 21A. FIG. 2 illustrates, for example, a case where the cathode active material layers 21B are provided on both surfaces of the cathode current collector 21A.

The cathode current collector 21A includes, for example, an electrically-conductive material such as aluminum.

The cathode active material layer 21B contains, as a cathode active material, a cathode material capable of inserting and extracting lithium. It should be understood that the cathode active material layer 21B may further contain other materials such as a cathode binder or a cathode conductive agent, for example.

The cathode material contains, for example, a lithium compound. The lithium compound is a generic term for a compound containing lithium as a constituent element. One reason for this is that it is possible to obtain a high energy density. The lithium compound is not particularly limited in its type; however, the lithium compound is, for example, a lithium composite oxide, a lithium phosphate compound, etc.

The lithium composite oxide is a generic term for an oxide containing lithium and one or more other elements as constituent elements. The lithium composite oxide has, for example, a crystal structure of a layered rock salt type, a spinel type, etc. The lithium phosphate compound is a generic term for a phosphate compound containing lithium and one or more other elements as constituent elements. The lithium phosphate compound has, for example, a crystal structure of olivine type, etc.

The other elements are elements other than lithium. The other elements are not particularly limited in their types; however, in particular, it is preferable that the other elements be elements belonging to any of Group 2 to Group 15 of a long-period periodic table. One reason for this is that it is possible to obtain a high voltage. Specifically, examples of the other elements include nickel, cobalt, manganese, iron, etc.

Examples of the lithium composite oxide having the crystal structure of the layered rock salt type include $LiNiO_2$, $LiCoO_2$, $LiCo_{0.98}Al_{0.01}Mg_{0.01}O_2$, $LiNi_{0.5}Co_{0.2}Mn_{0.3}O_2$, $LiNi_{0.8}Co_{0.15}Al_{0.05}O_2$, $LiNi_{0.33}Co_{0.33}Mn_{0.33}O_2$, $Li_{1.2}Mn_{0.52}Co_{0.175}Ni_{0.1}O_2$, $Li_{1.15}(Mn_{0.65}Ni_{0.22}Co_{0.13})O_2$, etc. Examples of the lithium composite oxide having the crystal structure of the spinel type include $LiMn_2O_4$, etc. Examples of the lithium phosphate compound having the crystal structure of the olivine type include $LiFePO_4$, $LiMnPO_4$, $LiFe_{0.5}Mn_{0.5}PO_4$, $LiFe_{0.3}Mn_{0.7}PO_4$, etc.

The cathode binder includes, for example, synthetic rubber, a polymer compound, etc. Examples of the synthetic rubber include styrene-butadiene-based rubber, etc. Examples of the polymer compound include polyvinylidene fluoride, polyimide, etc.

The cathode conductive agent includes, for example, an electrically-conductive material such as a carbon material. Examples of the carbon material include graphite, carbon black, acetylene black, ketjen black, etc. It should be understood that the cathode conductive agent may be a metal material, an electrically-conductive polymer, etc.

As illustrated in FIG. 2, the anode 22 includes, for example, an anode current collector 22A and an anode active material layer 22B provided on the anode current collector 22A. The anode active material layer 22B may be provided on, for example, only a single surface of the anode current collector 22A, or may be provided on both surfaces of the anode current collector 22A. FIG. 2 illustrates, for example, a case where the anode active material layers 22B are provided on both surfaces of the anode current collector 22A.

The anode current collector 22A includes, for example, an electrically-conductive material such as copper. It is preferable that a surface of the anode current collector 22A be roughened by an electrolysis method, etc. One reason for this is that an adhesion characteristic of the anode active material layer 22B to the anode current collector 22A is improved by utilizing an anchor effect.

The anode active material layer 22B contains, as an anode active material, an anode material capable of inserting and extracting lithium. It should be understood that the anode active material layer 22B may further contain other materials such as an anode binder or an anode conductive agent, for example.

In order to prevent lithium metal from being unintentionally deposited on the surface of the anode 22 during charging, it is preferable that a capacity of the chargeable anode material be greater than a discharge capacity of the cathode 21. In other words, it is preferable that electrochemical equivalent of the anode material be greater than electrochemical equivalent of the cathode 21.

The anode material includes a cyclic compound having a specific cyclic structure. Specifically, the cyclic compound contains one or more of a first cyclic compound represented by the following formula (1), a second cyclic compound represented by the following formula (2), and a third cyclic compound represented by the following formula (3). A type of the first cyclic compound may be only one type or two or more types. This similarly applies to each of the second cyclic compound and the third cyclic compound.

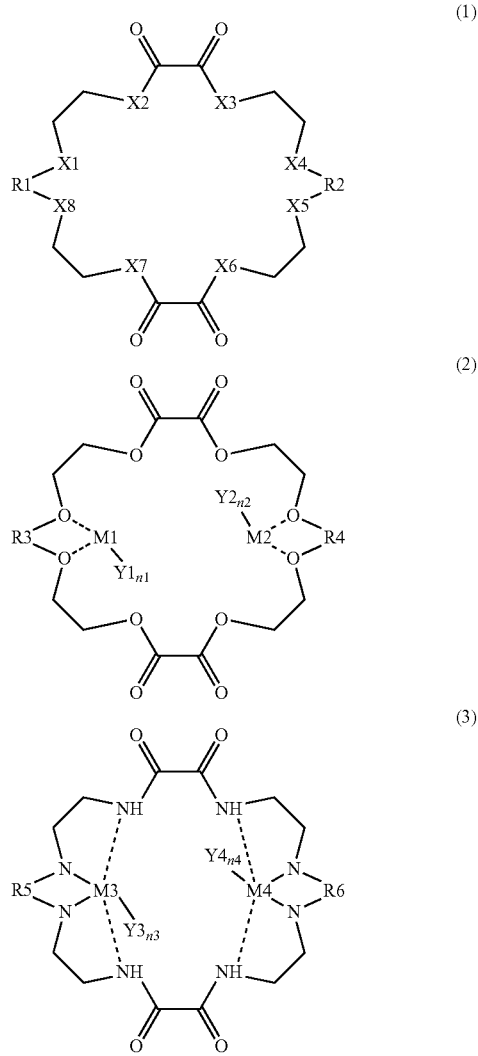

(Each of X1 to X8 is one of an oxo group and an imino group. Each of R1 to R6 is one of an ethylene group and a dicarbonyl group. Each of M1 to M4 is a metal element. Each of Y1 to Y4 is a halogen element. Each of n1 to n4 is an integer.)

The cyclic compound has a cyclic structure in which two or more dicarbonyl groups are included. More specifically, the cyclic compound has a cyclic structure represented by each of the formulae (1) to (3). In particular, no metal atom is introduced into a cyclic skeleton in the formula (1). In contrast, metal atoms (M1 to M4) are introduced into a cyclic skeleton in each of the formula (2) and the formula (3) by using coordinate bonding, covalent bonding, or both. It should be understood that a detailed configuration of each of the first cyclic compound, the second cyclic compound, and the third cyclic compound will be described later.

One reason why the anode 22 contains the cyclic compound is that, compared with a case where the anode 22 does not contain the cyclic compound, the cyclic compound serves as the anode material in a manner similar to that of a carbon material, etc. which will be described later, and the cyclic compound suppresses expansion and contraction of the anode active material layer 22B at times of charge and discharge.

In detail, the cyclic compound is capable of inserting and extracting lithium by utilizing an internal space of a cyclic skeleton (a coordination field). This makes it possible for the cyclic compound to serve as the anode material similarly to the carbon material, etc. Moreover, the cyclic compound is able to extend and contract like a spring by utilizing an extension-contraction characteristic of the cyclic skeleton. Accordingly, an expansion and contraction phenomenon of the anode active material layer 22B is made more moderate by utilizing the extension and contraction characteristic of the cyclic compound at the times of charge and discharge. As a result, it is more difficult for the anode active material layer 22B to expand and contract.

As represented by the formula (1), the first cyclic compound is a compound that has a cyclic skeleton containing two or more dicarbonyl groups and has no metal atom introduced into the cyclic skeleton. In other words, the first cyclic compound is an organic compound in which no inorganic part (no metal compound) is introduced into an organic part (the cyclic skeleton).

As described above, each of X1 to X8 is not particularly limited as long as it is one of an oxo group and an imino group. In other words, all of X1 to X8 may be oxo groups, all of X1 to X8 may be imino groups, or part of X1 to X8 may be oxo groups and the rest may be imino groups.

In particular, it is preferable that all of X1 to X8 be oxo groups or all of X1 to X8 be imino groups. One reason for this is that it is easier for the first cyclic compound to suppress expansion and contraction of the anode active material layer 22B at the times of charge and discharge.

As described above, each of R1 and R2 is not particularly limited as long as it is one of an ethylene group and a dicarbonyl group. In other words, both of R1 and R2 may be ethylene groups, both of R1 and R2 may be dicarbonyl groups, or one of R1 and R2 may be an ethylene group and the other may be a dicarbonyl group. Accordingly, the first cyclic compound has two to four dicarbonyl groups.

As represented by the formula (2), the second cyclic compound is a compound that has a cyclic oxygen skeleton containing two or more dicarbonyl groups and has metal atoms (M1 and M2) introduced into the cyclic oxygen skeleton by utilizing coordinate bonding. In other words, the second cyclic compound is an organic-inorganic hybrid compound in which an inorganic part (a metal compound) is introduced into an organic part (the cyclic oxygen skeleton).

In the second cyclic compound, the metal atom (M1) is coordinated to two oxygen atoms positioned on respective sides of R3, and the metal atom (M2) is coordinated to two oxygen atoms positioned on respective sides of R4. It should be understood that n1-number of halogen atoms (Y1) are covalently bonded to the metal atom (M1), and n2-number of halogen atoms (Y2) are covalently bonded to the metal atom (M2).

As described above, the second cyclic compound has the metal atoms (M1 and M2) introduced into the cyclic oxygen skeleton by utilizing coordinate bonding. Therefore, an advantage is obtained as compared with the first cyclic compound in which no metal atom is introduced into the cyclic skeleton. Specifically, an electrochemical capacity of the metal atom is utilized to make it easier for the anode 22 to insert and extract lithium, and a coordination potential of the metal atom (a metal species) is utilized to increase a potential of the anode 22.

Details related to each of R3 and R4 are similar to those related to each of R1 and R2. In other words, each of R3 and R4 is not particularly limited as long as it is one of an ethylene group and a dicarbonyl group. The second cyclic compound therefore has two to four dicarbonyl groups.

As described above, each of M1 and M2 is not particularly limited as long as it is a metal element. More specifically, each of M1 and M2 is not particularly limited as long as it is a metal atom (a metal element) capable of being coordinated to two oxygen atoms as described above. A type of M1 and a type of M2 may be the same as each other or different from each other, for example.

Specifically, examples of the metal element include tin (Sn), titanium (Ti), silicon (Si), copper (Cu), manganese (Mn), iron (Fe), niobium (Nb), nickel (Ni), cobalt (Co), aluminum (Al), zirconium (Zr), etc. One reason for this is that it is easier for the metal atoms (M1 and M2) to be coordinated to the cyclic oxygen skeleton. This makes it easier for the first cyclic compound to suppress expansion and contraction of the anode active material layer 22B at the times of charge and discharge, and the potential of the anode 22 becomes sufficiently high.

As described above, each of Y1 and Y2 is not particularly limited as long as it is a halogen element. A type of Y1 and a type of Y2 may be the same as each other or different from each other, for example. Further, types of n1-number of Y1s may be, for example, only one type or two or more types. This also similarly applies to types of n2-number of Y2 s.

Specifically, examples of each of Y1 and Y2 include fluorine (F), chlorine (Cl), bromine (Br), iodine (I), etc. One reason for this is that it is easier for the metal atoms (M1 and M2) to be coordinated to the cyclic oxygen skeleton. This makes it easier for the first cyclic compound to suppress expansion and contraction of the anode active material layer 22B at the times of charge and discharge, and allows the potential of the anode 22 to be sufficiently high.

n1 is the number of Y1 bonded to M1. A value of n1 is determined in accordance with the type of M1. n2 is the number of Y2 bonded to M2. A value of n2 is determined in accordance with the type of Y2. The values of n1 and n2 may be the same as each other or different from each other, for example.

The value of n1 is not particularly limited as long as it is an integer determined in accordance with the type of M1 as described above; however, the value of n1 is, for example, 2 or 4. The value of n2 is not particularly limited as long as it is an integer determined in accordance with the type of M2 as described above; however, the value of n2 is, for example, 2 or 4.

As represented by the formula (3), the third cyclic compound is a compound that has a cyclic nitrogen skeleton containing two or more dicarbonyl groups, and has metal atoms (M3 and M4) introduced into the cyclic nitrogen skeleton by utilizing coordinate bonding and covalent bonding. In other words, as with the second cyclic compound, the third cyclic compound is an organic-inorganic hybrid compound in which an inorganic part (a metal compound) is introduced into an organic part (the cyclic nitrogen skeleton).

In the third cyclic compound, the metal atom (M3) is covalently bonded to two nitrogen atoms positioned on respective sides of R5, and the metal atom (M4) is covalently bonded to two nitrogen atoms positioned on respective sides of R6. In this case, the metal atom (M3) is coordinated to a nitrogen atom positioned next to one of the two nitrogen atoms positioned on respective sides of R5, and the metal atom (M3) is coordinated to a nitrogen atom positioned next to the other of the two nitrogen atoms. Further, the metal atom (M4) is coordinated to a nitrogen atom positioned next to one of the two nitrogen atoms positioned on respective sides of R6, and the metal atom (M4) is coordinated to a nitrogen atom positioned next to the other of the two nitrogen atoms. It should be understood that n3-number of halogen atoms (Y3) are bonded to the metal atom (M3), and n4-number of halogen atoms (Y4) are bonded to the metal atom (M4).

In the third cyclic compound, the metal atoms (M3 and M4) are introduced into the cyclic nitrogen skeleton by utilizing coordinate bonding and covalent bonding, as described above. Therefore, it is possible to obtain an advantage similar to that of the second cyclic compound in which the metal atoms (M1 and M2) are introduced into the cyclic nitrogen skeleton by utilizing coordinate bonding.

Details related to each of R5 and R6 are similar to those related to each of R1 and R2. In other words, each of R5 and R6 is not particularly limited as long as it is one of an ethylene group and a dicarbonyl group. The third cyclic compound therefore has two to four dicarbonyl groups.

Details related to each of M3 and M4 are similar to those related to each of M1 and M2. In other words, each of M3 and M4 is not particularly limited as long as it is a metal atom (a metal element) that is able to be covalently bonded to two nitrogen atoms and is able to be coordinated to other two nitrogen atoms, as described above. A type of M3 and a type of M4 may be the same as each other or different from each other, for example.

Details related to each of Y3 and Y4 are similar to those related to each of Y1 and Y2. A type of Y1 and a type of Y2 may be the same as each other or different from each other, for example. Further, types of n1-number of Y1s may be, for example, only one type or two or more types, and types of n2-number of Y2s may be, for example, only one type or two or more types.

Details related to each of n3 and n4 are similar to those related to each of n1 and n2. n3 is number of Y3 bonded to M3. A value of n3 is determined in accordance with the type of M3. n4 is number of Y4 bonded to M4. A value of n4 is determined in accordance with the type of M4.

In particular, it is preferable that the first cyclic compound be a compound represented by the following formula (4). It is preferable that the second cyclic compound be a compound represented by the following formula (5). It is preferable that the third cyclic compound be a compound represented by the following formula (6). One reason for this is that it is easier for the cyclic compound to expand and contract, which, in turn, makes it more difficult for the anode active material layer 22B to expand and contract at the times of charge and discharge.

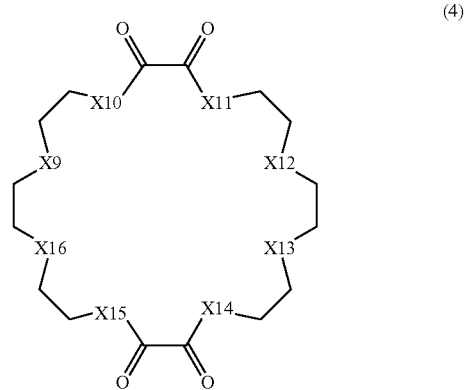

(4)

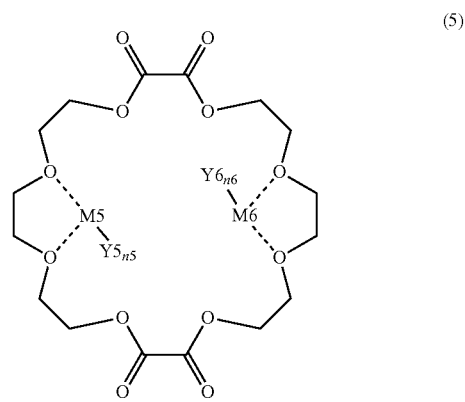

(5)

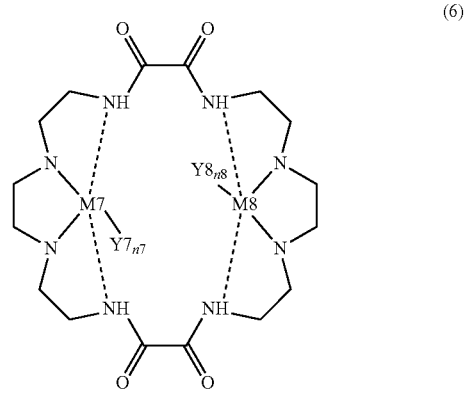

(6)

(Each of X9 to X16 is of an oxo group and an imino group. Each of M5 to M8 is a metal element. Each of Y5 to Y8 is a halogen element. Each of n5 to n8 is an integer.)

The compound represented by the formula (4) is a cyclic non-metallic coordination compound in which each of R1 and R2 is an ethylene group, of the first cyclic compound represented by the formula (1).

Specifically, examples of the cyclic non-metallic coordination compound include compounds represented by the following respective formula (4-1) and formula (4-2), etc.

(4-1)

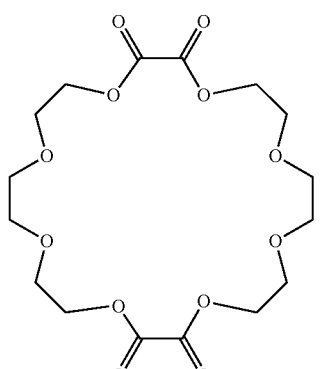

(4-2)

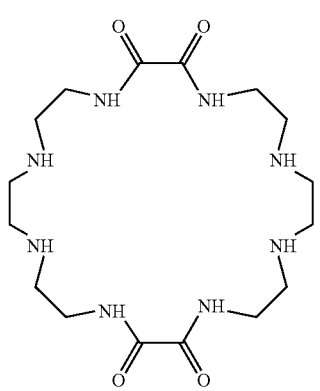

The compound represented by the formula (5) is a crown-ether-type metal coordination compound in which each of R3 and R4 is an ethylene group, of the second cyclic compound represented by the formula (2). Details related to M5, M6, Y5, Y6, n5, and n6 are similar to those related to M1, M2, Y1, Y2, n1, and n2, respectively, for example.

Examples of the crown-ether-type metal coordination compound include compounds represented by the following respective formula (5-1) to formula (5-12), etc. It should be understood that each of the formula (5-1) to the formula (5-11) represents a case where each of Y5 and Y6 in the formula (5) is chlorine, for example. Each of Y5 and Y6 may be, however, fluorine, bromine, or iodine, for example, as described above. Specifically, for example, as represented by the formula (5-12), each of Y5 and Y6 may be fluorine.

(5-1)

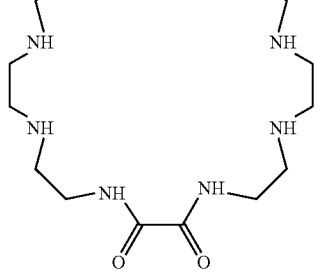

(5-2)

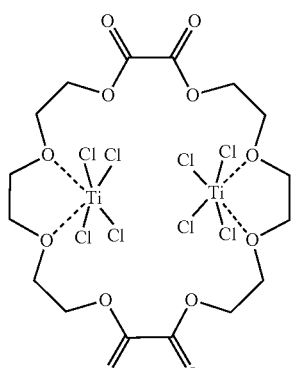

(5-3)

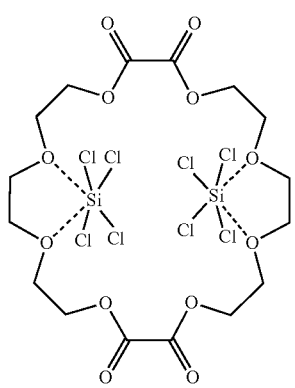

(5-4)

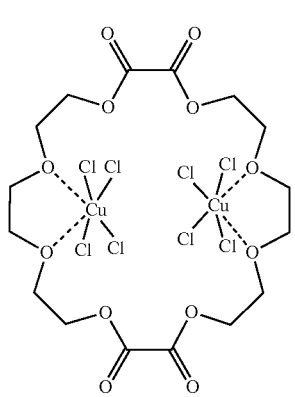

(5-5)

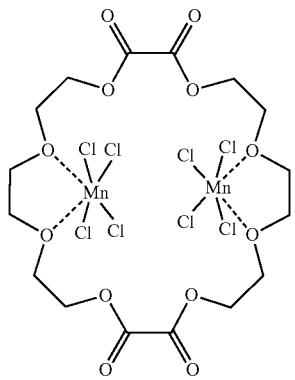

(5-6) 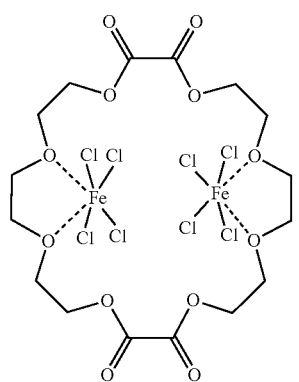

(5-7) 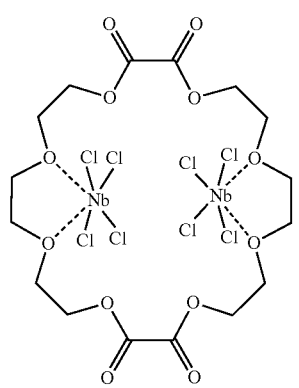

(5-8) 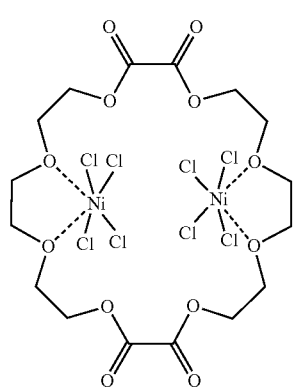

(5-9) 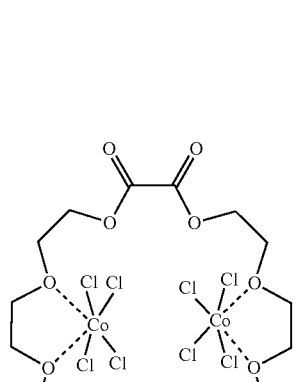

(5-10) 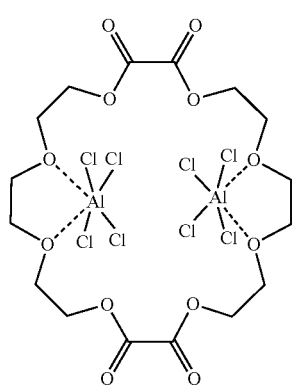

(5-11) 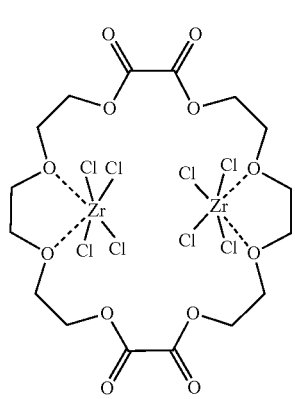

(5-12) 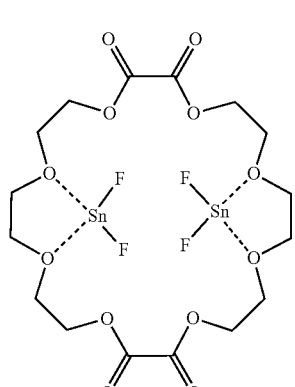

The compound represented by the formula (6) is an azacrown-ether-type metal coordination compound in which each of R5 and R6 is an ethylene group, of the third cyclic compound represented by the formula (3). Details related to M7, M8, Y7, Y8, n7, and n8 are similar to those related to M1, M2, Y1, Y2, n1, and n2, respectively, for example.

Examples of examples of the azacrown-ether-type metal coordination compound include compounds represented by the respective following formula (6-1) to formula (6-12). It should be understood that each of the formula (6-1) to the formula (6-11) represents, for example, a case where each of Y7 and Y8 in the formula (6) is chlorine. Each of Y7 and Y8 may be, however, fluorine, bromine, or iodine, for example, as described above. Specifically, for example, as represented by the formula (6-12), each of Y7 and Y8 may be fluorine.

(6-1)
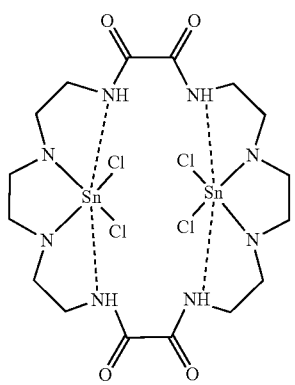
(6-2)
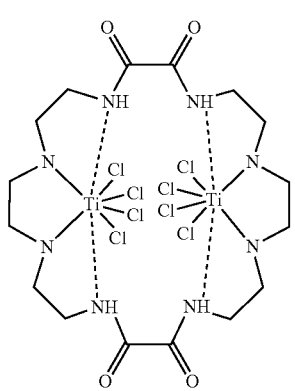
(6-3)
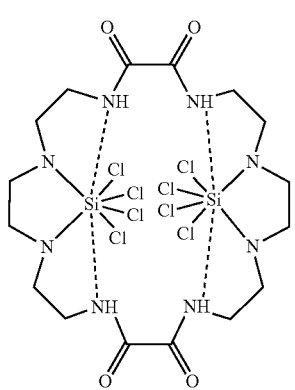
(6-4)
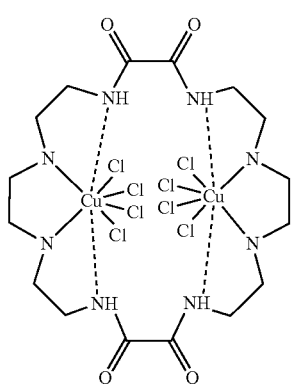
-continued
(6-5)
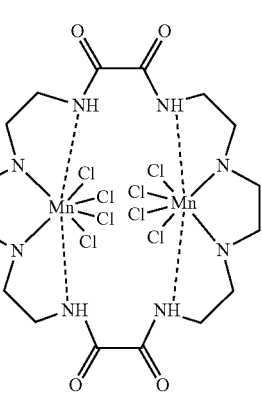
(6-6)
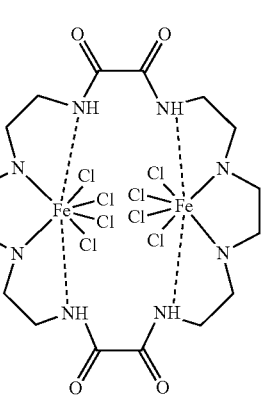
(6-7)
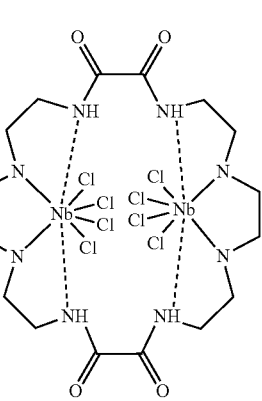
(6-8)
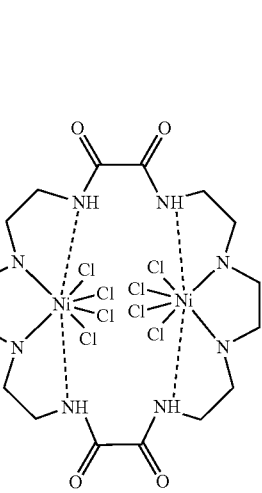

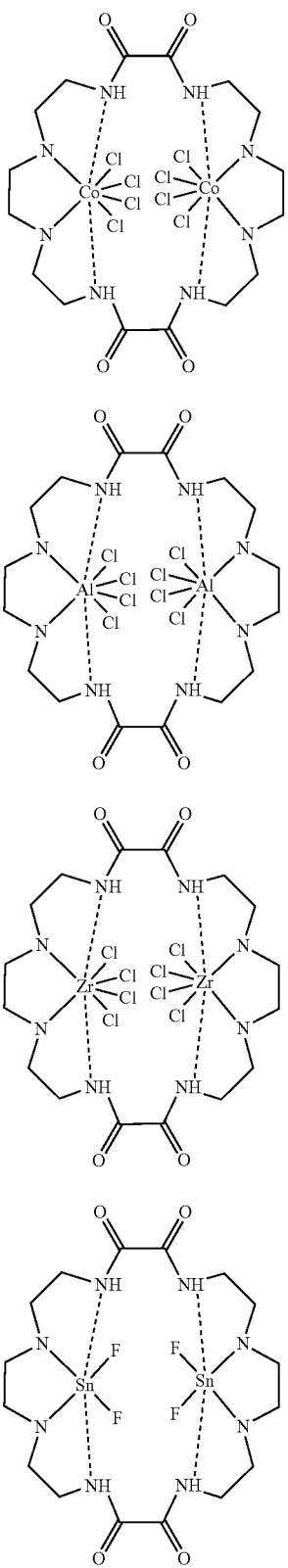

(6-9)

(6-10)

(6-11)

(6-12)

It should be understood that the anode material may contain, for example, other anode materials in addition to the above-described cyclic compound. The other materials are not particularly limited in their types; however, examples of the other materials include a carbon material, a metal-based material, etc.

The carbon material is a generic term for a material containing carbon as a constituent element. One reason for this is that a crystal structure of the carbon material hardly changes at the times of insertion and extraction of lithium, which makes it possible to stably obtain a high energy density. Further, another reason for this is that the carbon material also serves as an anode conductive agent, which improves electric conductivity of the anode active material layer 22B.

Examples of the carbon material include graphitizable carbon, non-graphitizable carbon, graphite, etc. It should be understood that plane spacing of a (002) plane in the non-graphitizable carbon is preferably 0.37 nm or more, and plane spacing of a (002) plane in the graphite is preferably 0.34 nm or less.

More specifically, examples of the carbon material include pyrolytic carbons, cokes, glassy carbon fibers, fired bodies of organic polymer compounds, activated carbon, carbon blacks, etc. The cokes include, for example, pitch coke, needle coke, petroleum coke, etc. The fired body of the organic polymer compound is a fired product as a result of firing (carbonizing) a polymer compound such as a phenol resin or a furan resin at an appropriate temperature. Other than the above, the carbon material may be, for example, low-crystalline carbon subjected to a heat treatment at a temperature of about 1000° C. or lower, or amorphous carbon. Examples of a shape of the carbon material include a fibrous shape, a spherical shape, a granular shape, a scaly shape, etc.

The metal-based material is a generic term for a material containing one or more of metal elements and metalloid elements as constituent elements. One reason for this is that it is possible to obtain a high energy density.

The metal-based material may be a simple substance, an alloy, a compound, a mixture of two or more thereof, or a material containing one or more phases thereof. It should be understood that the alloy encompasses not only a compound containing two or more metal elements, but also a compound containing one or more metal elements and one or more metalloid elements. Further, the alloy may contain one or more non-metal elements. Examples of a structure of the metal-based material include a solid solution, a eutectic (an eutectic mixture), an intermetallic compound, a coexistence of two or more thereof, etc.

Each of the metal element and the metaloid element is able to form an alloy with lithium. Specifically, examples of the metal element and the metalloid element include magnesium, boron, aluminum, gallium, indium, silicon, germanium, tin, lead, bismuth, cadmium, silver, zinc, hafnium, zirconium, yttrium, palladium, platinum, etc.

In particular, silicon and tin are preferable, and silicon is more preferable. One reason for this is that it is possible to obtain a remarkably-high energy density owing to superior insertion and extraction performance of lithium.

Specifically, the metal-based material may be a simple substance of silicon, an alloy of silicon, a compound of silicon, a simple substance of tin, an alloy of tin, a compound of tin, a mixture of two or more thereof, or a material containing one or more phases thereof. Since the single substance described here refers to a general single substance, the single substance may contain a slight amount of impurities. In other words, purity of the single substance is not necessarily limited to 100%.

The alloy of silicon contains, for example, tin, nickel, copper, iron, cobalt, manganese, zinc, indium, silver, titanium, germanium, bismuth, antimony, chromium, etc., as constituent elements other than silicon. The compound of silicon contains, for example, carbon, oxygen, etc., as constituent elements other than silicon. It should be understood that the compound of silicon may contain, for example, the constituent element described related to the alloy of silicon, as a constituent element other than silicon.

Examples of the alloy of silicon and the compound of silicon include $SiB_4$, $SiB_6$, $Mg_2Si$, $Ni_2Si$, $TiSi_2$, $MoSi_2$, $CoSi_2$, $NiSi_2$, $CaSi_2$, $CrSi_2$, $Cu_5Si$, $FeSi_2$ $MnSi_2$, $NbSi_2$, $TaSi_2$, $VSi_2$, $WSi_2$, $ZnSi_2$, $SiC$, $Si_3N_4$, $Si_2N_2O$, $SiO_v$ ($0 < v \le 2$), etc. It should be understood that a range of v may be, for example, $0.2 < v < 1.4$.

The alloy of tin contains, for example, silicon, nickel, copper, iron, cobalt, manganese, zinc, indium, silver, titanium, germanium, bismuth, antimony, chromium, etc., as constituent elements other than tin. The compound of tin contains, for example, carbon, oxygen, etc., as constituent elements other than tin. It should be understood that the compound of tin may contain, for example, the constituent element described related to the alloy of tin as a constituent element other than tin.

Examples of the alloy of tin and the compound of tin include $SnO_w$ ($0 < w \le 2$), $SnSiO_3$, $Mg_2Sn$, etc.

In particular, it is preferable that the anode material contain the carbon material, the metal-based material, or both, together with the cyclic compound. In this case, the anode material may contain the carbon material together with the cyclic compound, may contain the metal-based material together with the cyclic compound, or may contain the carbon material and the metal-based material together with the cyclic compound. One reason for this is that it is possible to obtain a high theoretical capacity (battery capacity) and this sufficiently makes it more difficult for the anode active material layer 22B to expand and contract at the times of charge and discharge.

A mixture ratio of the cyclic compound to the carbon material and the metal-based material is not particularly limited. In particular, a weight ratio of the cyclic compound to the cyclic compound, the carbon material, and the metal-based material (=weight of cyclic compound/(weight of cyclic compound+weight of carbon material+weight of metal-based material)) is preferably from 0.01 to 0.99, and more preferably, from 0.05 to 0.90. One reason for this is that it is possible to obtain a high battery capacity while the expansion and contraction of the anode active material layer 22B at the times of charge and discharge are sufficiently suppressed.

Details related to the anode binder are, for example, similar to those related to the cathode binder. Details of the anode conductive agent are, for example, similar to those of the cathode conductive agent.

A method of forming the anode active material layer 22B is not particularly limited; however, examples thereof include a coating method, a vapor phase method, a liquid phase method, a thermal spraying method, a firing method (a sintering method), etc. The coating method is, for example, a method that applies, to the anode current collector 22A, a solution in which a mixture of the anode active material in the form of particles (powder), the anode binder, etc. is dissolved or dispersed by an organic solvent, etc. Examples of the vapor phase method include a physical deposition method, a chemical deposition method, etc. More specifically, examples of the vapor phase method include a vacuum deposition method, a sputtering method, an ion plating method, a laser ablation method, a thermal chemical vapor deposition method, a chemical vapor deposition method (CVD), a plasma chemical vapor deposition method, etc. Examples of the liquid phase method include an electrolytic plating method, an electroless plating method, etc. The thermal spraying method is a method of spraying the anode active material in a molten state or a semi-molten state onto the anode current collector 22A. The firing method is, for example, a method of applying a solution to the anode current collector 22A by a coating method, and thereafter performing a heat treatment on the solution (a coating film) at a temperature higher than a melting point of the anode binder, etc. More specific examples of the firing method include an atmosphere firing method, a reaction firing method, a hot press firing method, etc.

As illustrated in FIG. 2, for example, the separator 23 is interposed between the cathode 21 and the anode 22. The separator 23 allows a lithium ion to pass therethrough while preventing short-circuiting caused by contact of the two electrodes. The separator 23 includes, for example, a porous film of a synthetic resin, ceramic, etc. The separator 23 may be a laminated film in which two or more porous films are laminated on each other. Examples of the synthetic resin include polyethylene, etc.

In particular, the separator 23 may include, for example, the above-described porous film (a base layer) and a polymer compound layer provided on the base layer. The polymer compound layer may be provided on only one side of the base layer, or may be provided on both sides of the base layer. One reason for this is that adhesiveness of the separator 23 to each of the cathode 21 and the anode 22 improves, which makes it more difficult for the spirally-wound electrode body 20 to be distorted. Accordingly, a decomposition reaction of the electrolytic solution is suppressed, and leakage of the electrolytic solution with which the base layer is impregnated is also suppressed. Therefore, even when charge and discharge are repeated, it is more difficult for electrical resistance of the lithium ion secondary battery to rise, and it is more difficult for the lithium ion secondary battery to swell.

The polymer compound layer contains, for example, a polymer compound such as polyvinylidene fluoride. One reason for this is that it is superior in physical strength and is electrochemically stable. It should be understood that the polymer compound layer may contain an insulating particle such as an inorganic particle, for example. One reason for this is that safety improves. The inorganic particle is not particularly limited in its type; however, the inorganic particle is, for example, aluminum oxide, aluminum nitride, etc.

As described above, the spirally-wound electrode body 20 is impregnated with the electrolytic solution. For this reason, for example, the separator 23 is impregnated with the electrolytic solution and each of the cathode 21 and the anode 22 is impregnated with the electrolytic solution.

The electrolytic solution contains a solvent and an electrolyte salt. It should be understood that the electrolytic solution may further contain various additives, for example.

The solvent contains, for example, a non-aqueous solvent (an organic solvent). The electrolytic solution containing the non-aqueous solvent is a so-called non-aqueous electrolytic solution. Examples of the non-aqueous solvent include cyclic carbonate ester, chain carbonate ester, chain carboxylate ester, lactone, a nitrile (mononitrile) compound, etc. One reason for this is that it is possible to obtain a superior battery capacity, a superior cycle characteristic, a superior storage characteristic, etc.

Examples of the cyclic carbonate ester include ethylene carbonate, propylene carbonate, butylene carbonate, etc. Examples of the chain carbonate ester include dimethyl carbonate, diethyl carbonate, ethyl methyl carbonate, methylpropyl carbonate, etc. Examples of the chain carboxylate ester include methyl acetate, ethyl acetate, methyl propionate, ethyl propionate, propyl propionate, methyl butyrate, methyl isobutyrate, methyl trimethylacetate, ethyl trimethylacetate, etc. Examples of the lactone include γ-butyrolactone, γ-valerolactone, etc. Examples of the nitrile compound include acetonitrile, methoxyacetonitrile, 3-methoxypropionitrile, etc.

Further, examples of the non-aqueous solvent include 1,2-dimethoxyethane, tetrahydrofuran, 2-methyltetrahydrofuran, tetrahydropyran, 1,3-dioxolane, 4-methyl-1,3-dioxolane, 1,3-dioxane, 1,4-dioxane, N,N-dimethylformamide, N-methylpyrrolidinone, N-methyloxazolidinone, N,N'-dimethylimidazolidinone, nitromethane, nitroethane, sulfolane, trimethyl phosphate, dimethylsulfoxide, etc. One reason for this is that it is possible to obtain a similar advantage.

Other than the above, the non-aqueous solvent may be unsaturated cyclic carbonate ester, halogenated carbonate ester, sulfonate ester, acid anhydride, a polyvalent nitrile compound, a diisocyanate compound, phosphate ester, etc. One reason for this is that chemical stability of the electrolytic solution improves.

Examples of the unsaturated cyclic carbonate ester include vinylene carbonate (1,3-dioxol-2-one), vinylethylene carbonate (4-vinyl-1,3-dioxolane-2-one), methylene ethylene carbonate (4-methylene-1,3-dioxolane-2-one), etc. Examples of the halogenated carbonate ester include 4-fluoro-1,3-dioxolan-2-one, 4,5-difluoro-1,3-dioxolan-2-one, fluoromethylmethylcarbonate, bis(fluoromethyl)carbonate, difluoromethylmethylcarbonate, etc. Examples of the sulfonate ester include 1,3-propane sulton, 1,3-propene sulton, etc. Examples of the acid anhydride include succinic anhydride, ethanedisulfonic anhydride, sulfobenzoic anhydride, etc. Examples of the polyvalent nitrile compound include succinonitrile, etc. Examples of the diisocyanate compound include OCN—$C_6H_{12}$—NCO, etc. Examples of the phosphate ester include trimethyl phosphate, etc.

The electrolyte salt is, for example, a lithium salt. It should be understood that the electrolyte salt may further contain, for example, a salt other than the lithium salt. Examples of the other salts include a salt of light metal other than lithium.

Examples of the lithium salt include lithium hexafluorophosphate ($LiPF_6$), lithium tetrafluoroborate ($LiBF_4$), bis(fluorosulfonyl)amidolithium ($LiN(SO_2F)_2$), bis(trifluoromethanesulfonyl)amidolithium ($LiN(CF_3SO_2)_2$), lithium difluorophosphate ($LiPF_2O_2$), lithium fluorophosphate ($Li_2PFO_3$), etc.

A content of the electrolyte salt is not particularly limited; however, the content of the electrolyte salt is, for example, from 0.3 mol/kg to 3.0 mol/kg with respect to the solvent.

The lithium ion secondary battery operates as follows, for example. At the time of charge, lithium ions are extracted from the cathode 21, and the lithium ions are inserted in the anode 22 via the electrolytic solution. At the time of discharge, lithium ions are extracted from the anode 22, and the lithium ions are inserted in the cathode 21 via the electrolytic solution.

The lithium ion secondary battery is manufactured by, for example, the following procedure.

First, a cathode active material is mixed with a cathode binder, a cathode conductive agent, etc. on an as-needed basis to provide a cathode mixture. Thereafter, the cathode mixture is dispersed in an organic solvent, etc. to obtain a paste-like cathode slurry. Lastly, after the cathode mixture slurry is applied to both surfaces of the cathode current collector 21A, the cathode mixture slurry is dried to form the cathode active material layer 21B. Thereafter, the cathode active material layer 21B may be compression-molded by using a roll press machine, etc. In this case, the cathode active material layer 21B may be heated, or compression molding may be repeated a plurality of times.

The anode active material layers 22B are formed on both surfaces of the anode current collector 22A by a procedure similar to the fabrication procedure of the cathode 21 described above. Specifically, an anode active material containing the cyclic compound is mixed with an anode binder, an anode conductive agent, etc., on an as-needed basis to provide an anode mixture. Thereafter, the anode mixture is dispersed in an organic solvent, etc. to obtain a paste-like anode mixture slurry. Thereafter, the anode mixture slurry is applied to both surfaces of the anode current collector 22A, and thereafter, the anode mixture slurry is dried. The anode active material layer 22B is thereby formed. As a result, the anode 22 is fabricated. Thereafter, the anode active material layer 22B may be compression-molded.

After adding the electrolyte salt to the solvent, the solvent is stirred. The electrolyte salt is thereby dissolved. As a result, the electrolytic solution is prepared.

First, the cathode lead 25 is coupled to the cathode current collector 21A by a welding method, etc., and the anode lead 26 is coupled to the anode current collector 22A by a welding method, etc. Thereafter, the cathode 21 and the anode 22 are stacked on each other with the separator 23 interposed therebetween. Thereafter, the cathode 21, the anode 22, and the separator 23 are spirally wound to form a spirally-wound body. Thereafter, the center pin 24 is inserted into the space 20C provided at the spirally-winding center of the spirally-wound body.

Thereafter, in a state in which the spirally-wound body is sandwiched between the pair of insulating plates 12 and 13, the spirally-wound body is accommodated inside the battery can 11 together with the insulating plates 12 and 13. In this case, the cathode lead 25 is coupled to the safety valve mechanism 15 by a welding method, etc., and the anode lead 26 is coupled to the battery can 11 by a welding method, etc. Thereafter, the electrolytic solution is injected into the battery can 11 to impregnate the spirally-wound body with the electrolytic solution. Each of the cathode 21, the anode 22, and the separator 23 is thereby impregnated with the electrolytic solution. As a result, the spirally-wound electrode body 20 is formed.

Lastly, the open end of the battery can 11 is swaged with the gasket 17. The battery cover 14, the safety valve mechanism 15, and the positive temperature coefficient device 16 are thereby attached to the open end of the battery can 11. The spirally-wound electrode body 20 is thereby sealed inside the battery can 11. As a result, the lithium ion secondary battery is completed.

According to the cylindrical-type lithium ion secondary battery, the anode 22 contains the cyclic compound, i.e., one or more of the first cyclic compound, the second cyclic compound, and the third cyclic compound. In this case, as compared with the case where the anode 22 does not contain the cyclic compound, the cyclic compound serves as the anode active material (the anode material), and the cyclic compound suppresses expansion and contraction of the anode active material layer 22B at the times of charge and discharge, as described above. As a result, it is possible to obtain a superior battery characteristic.

The case where the anode 22 does not contain the cyclic compound described above refers to not only a case where the anode 22 does not contain any of the first cyclic compound, the second cyclic compound, and the third cyclic compound, but also a case where the anode 22 contains other cyclic compound similar to the cyclic compound. Examples of the other cyclic compounds include an oxygen-containing cyclic compound, a nitrogen-containing cyclic compound, an oxygen-nitrogen-containing cyclic compound, etc. Examples of the oxygen-containing cyclic compound include crown ether, cryptand, etc. Examples of the nitrogen-containing cyclic compound include cyclene, etc. Examples of the oxygen-nitrogen-containing cyclic compound include 4,10-diaza-12-crown 4-ether, etc.

In particular, when each of M1 to M4 is tin, etc., it is easier for the metal atoms (M1 to M4) to be coordinated to the cyclic skeleton (the cyclic oxygen skeleton and the cyclic nitrogen skeleton). This makes it easier to suppress expansion and contraction of the anode active material layer 22B at the times of charge and discharge, and sufficiently increases the potential of the anode 22. As a result, it is possible to obtain a higher effect.

Further, when each of Y1 to Y4 is fluorine, etc., as with the case where each of M1 to M4 is tin, etc., it is easier for the metal atoms (M1 to M4) to be coordinated to the cyclic skeleton (the cyclic oxygen skeleton and the cyclic nitrogen skeleton). As a result, it is possible to obtain a higher effect.

Further, when all of X1 to X8 are oxo groups or imino groups, it is easier to suppress expansion and contraction of the anode active material layer 22B at the times of charge and discharge. As a result, it is possible to obtain a higher effect.

Further, when the first cyclic compound is a cyclic non-metallic coordination compound, the second cyclic compound is a crown-ether-type metal coordination compound, and the third cyclic compound is an azacrown-ether-type metal coordination compound, it is easier for the cyclic compound to extend and contract. This makes it more difficult for the anode active material layer 22B to expand and contract at the times of charge and discharge. As a result, it is possible to obtain a higher effect.

Further, when the anode 22 contains the carbon material, the metal-based material, or both together with the cyclic compound, and the weight ratio thereof is from 0.01 to 0.99, it is possible to obtain a high battery capacity while the expansion and contraction of the anode active material layer 22B at the times of charge and discharge are sufficiently suppressed. As a result, it is possible to obtain a higher effect. One reason is.

Other than the above, according to the anode 22 to be used in the cylindrical-type lithium ion secondary battery, the anode 22 contains the above-described cyclic compound. Accordingly, it is possible to obtain a superior battery characteristic for a reason similar to that of the case described related to the ithium ion secondary battery.

Next, description is given of another lithium ion secondary battery according to one embodiment of the present technology and another anode for a lithium ion secondary battery according to one embodiment of the present technology. In the description below, the components of the cylindrical-type lithium ion secondary battery that have been already described (see FIGS. 1 and 2) will be referred to where appropriate.

Figure 3:
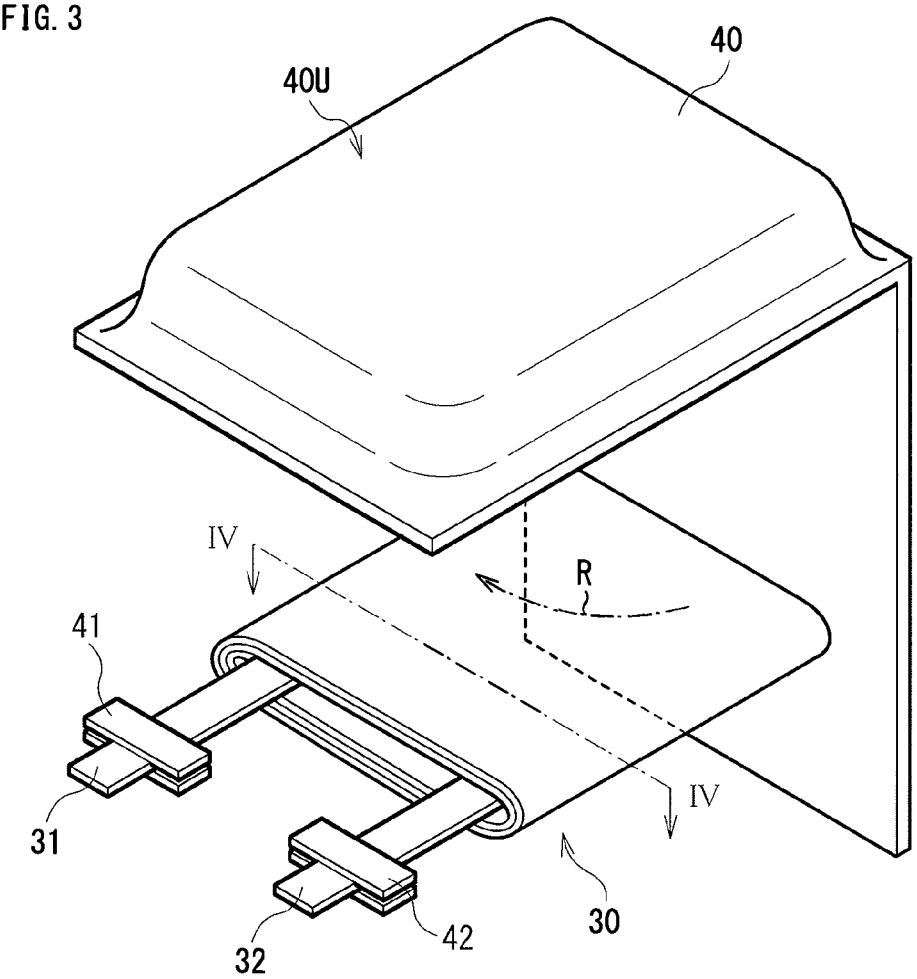
FIG. 3 is a perspective view of a configuration of another lithium ion secondary battery (laminated film type) according to an embodiment of the present technology.
Figure 4:
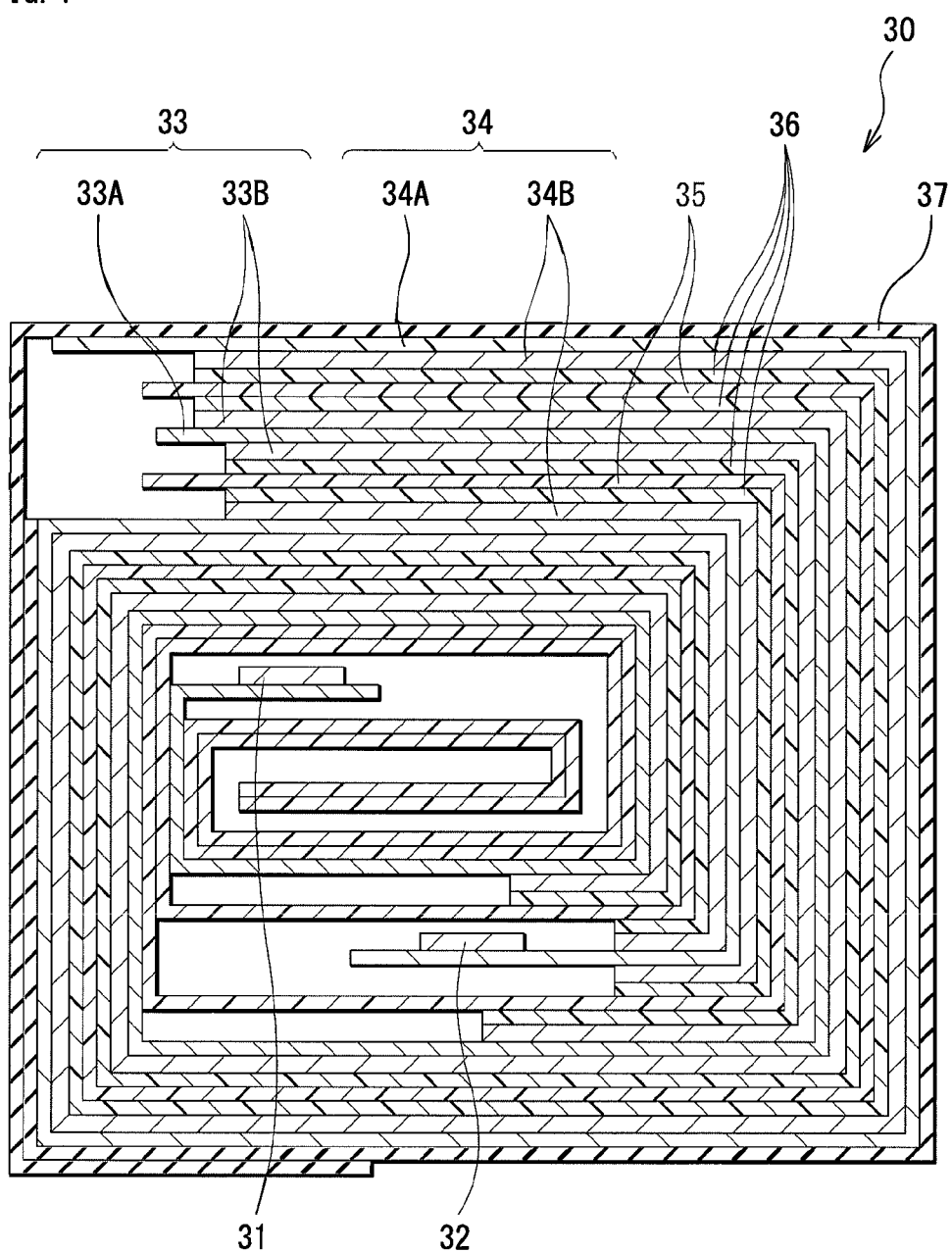
FIG. 4 is an enlarged cross-sectional view of a configuration of a main part of the lithium ion secondary battery illustrated in FIG. 3.

FIG. 3 illustrates a perspective configuration of another lithium ion secondary battery, and FIG. 4 enlarges a cross-sectional configuration of a main part (a spirally-wound electrode body 30) of the lithium ion secondary battery taken along a IV-IV line illustrated in FIG. 3. It should be understood that FIG. 4 illustrates a state in which the spirally-wound electrode body 30 and an outer package member 40 are separated from each other.

As illustrated in FIG. 4, the lithium ion secondary battery is, for example, a lithium ion secondary battery of a laminated film type in which a battery device (the spirally-wound electrode body 30) is accommodated inside the film-like outer package member 40 having pliability (or flexibility).

The spirally-wound electrode body 30 is, for example, a structure formed by stacking a cathode 33 and an anode 34 with a separator 35 and an electrolyte layer 36 interposed therebetween, and thereafter sprially winding the cathode 33, the anode 34, the separator 35, and the electrolyte layer 36. A surface of the spirally-wound electrode body 30 is protected by, for example, a protective tape 37. The electrolyte layer 36 is interposed between, for example, the cathode 33 and the separator 35, and is interposed between the anode 34 and the separator 35.

A cathode lead 31 is coupled to the cathode 33. The cathode lead 31 is led out from inside toward outside of the outer package member 40. A material for forming the cathode lead 31 is, for example, similar to the material for forming the cathode lead 25. A shape of the cathode lead 31 is, for example, a thin plate shape, a mesh shape, etc.

An anode lead 32 is coupled to the anode 34. The anode lead 32 is led out from inside toward outside of the outer package member 40. A lead-out direction of the anode lead 32 is, for example, the same as a lead-out direction of the cathode lead 31. A material for forming the anode lead 32 is, for example, similar to the material for forming the anode lead 26. A shape of the anode lead 32 is, for example, similar to the shape of the cathode lead 31.

The outer package member 40 is, for example, a single film that is foldable in a direction of an arrow R illustrated in FIG. 3. For example, a depression 40U directed to accommodating the spirally-wound electrode body 30 is provided in a portion of the outer package member 40.

The outer package member 40 is, for example, a laminate (a laminated film) in which a fusion bonding layer, a metal layer, and a surface protection layer are laminated in this order from the inside toward the outside. In a manufacturing process of the lithium ion secondary battery, for example, the outer package member 40 is so folded that the fusion bonding layers are opposed to each other with the spirally-wound electrode body 30 interposed therebetween, and thereafter, outer peripheral edges of the fusion bonding layers are fusion bonded to each other. The fusion bonding layer is, for example, a film containing a polymer compound such as polypropylene. The metal layer is, for example, a metal foil containing a metal material such as aluminum. The surface protection layer is, for example, a film containing a polymer compound such as nylon. It should be understood that the outer package member 40 includes, for example, two laminated films. The two laminated films may be bonded to each other with an adhesive in between, for example.

An adhesive film 41 is inserted between the outer package member 40 and the cathode lead 31, for example, in order to prevent entry of outside air. The adhesive film 41 includes a material having adhesion with respect to the cathode lead 31. The above-described material is, for example, a polyolefin resin such as polypropylene.

For example, an adhesive film 42 is inserted between the outer package member 40 and the anode lead 32. The adhesive film 42 has a function similar to that of the adhesive film 41. A material for forming the adhesive film 42 is similar to the material for forming the adhesive film 41 except that it has adhesion with respect to the anode lead 32 instead of the cathode lead 31.

The cathode 33 includes, for example, a cathode current collector 33A and a cathode active material layer 33B, and the anode 34 includes, for example, an anode current collector 34A and an anode active material layer 34B. Configurations of the cathode current collector 33A, the cathode active material layer 33B, the anode current collector 34A, and the anode active material layer 34B are, for example, similar to the configurations of the cathode current collector 21A, the cathode active material layer 21B, the anode current collector 22A, and the anode active material layer 22B, respectively. That is, the anode 34 contains the cyclic compound. More specifically, the anode 34 contains one or more of the first cyclic compound, the second cyclic compound, and the third cyclic compound. Further, a configuration of the separator 35 is, for example, similar to that of the separator 23.

The electrolyte layer 36 contains a polymer compound together with an electrolytic solution. Since the electrolyte layer 36 described here is a so-called gel electrolyte, the electrolytic solution is held by the polymer compound in the electrolyte layer 36. One reason for this is that it is possible to obtain high ionic conductivity (for example, 1 mS/cm or more at room temperature) and leakage of the electrolytic solution is prevented. It should be understood that the electrolyte layer 36 may further include other materials such as various additives, for example.

A configuration of the electrolytic solution is similar to that of the electrolytic solution to be used in the cylindrical-type secondary battery. The polymer compound includes, for example, a homopolymer, a copolymer, or both. Examples of the homopolymer include polyvinylidene fluoride, etc. Examples of the copolymer include a copolymer of vinylidene fluoride and hexafluoropyrene, etc.

In the electrolyte layer 36 which is a gel electrolyte, a solvent contained in the electrolytic solution is a broad concept encompassing not only a liquid material but also a material having ionic conductivity capable of dissociating the electrolyte salt. Therefore, in a case where a polymer compound having ionic conductivity is used, the polymer compound is also included in the solvent.

It should be understood that the electrolytic solution may be used as it is instead of the electrolyte layer 36. In this case, the spirally-wound electrode body 30 (the cathode 33, the anode 34, and the separator 35) is impregnated with the electrolytic solution.

The lithium ion secondary battery operates as follows, for example. At the time of charge, lithium ions are extracted from the cathode 33, and the lithium ions are inserted in the anode 34 via the electrolyte layer 36. At the time of discharge, lithium ions are extracted from the anode 34, and the lithium ions are inserted in the cathode 33 via the electrolyte layer 36.

The lithium ion secondary battery including the electrolyte layer 36 is manufactured by, for example, three procedures described below.

[First Procedure]

First, the cathode 33 is fabricated by a procedure similar to the procedure of fabricating the cathode 21, and the anode 34 is fabricated by a procedure similar to the procedure of fabricating the anode 22. In other words, in the case of fabricating the cathode 33, the cathode active material layers 33B are formed on both surfaces of the cathode current collector 33A, and in the case of fabricating the anode 34, the anode active material layers 34B are formed on both surfaces of the anode current collector 34A.

Thereafter, the electrolytic solution is prepared by a procedure similar to that of the method of preparing the electrolytic solution used in the cylindrical-type secondary battery. Thereafter, the electrolytic solution, the polymer compound, the organic solvent, etc. are mixed to prepare a precursor solution. Thereafter, the precursor solution is applied to the cathode 33. Thereafter, the precursor solution is dried to form the electrolyte layer 36. The precursor solution is also applied to the anode 34. Thereafter, the precursor solution is dried to form the electrolyte layer 36. Thereafter, the cathode lead 31 is coupled to the cathode current collector 33A by a welding method, etc., and the anode lead 32 is coupled to the anode current collector 34A by a welding method, etc. Thereafter, the cathode 33 and the anode 34 are stacked on each other with the separator 35 interposed therebetween. Thereafter, the cathode 33, the anode 34, and the separator 35 are spirally wound to form the spirally-wound electrode body 30. Thereafter, the protective tape 37 is attached to the surface of the spirally-wound electrode body 30.

Lastly, the outer package member 40 is so folded as to sandwich the spirally-wound electrode body 30, and thereafter, outer peripheral edges of the outer package member 40 are bonded to each other by using a thermal fusion method, etc. In this case, the adhesive film 41 is inserted between the cathode lead 31 and the outer package member 40, and the adhesive film 42 is inserted between the anode lead 32 and the outer package member 40. The spirally-wound electrode body 30 is thereby sealed inside the outer package member 40. As a result, the lithium ion secondary battery is completed.

[Second Procedure]

First, the cathode 33 and the anode 34 are fabricated. Thereafter, the cathode lead 31 is coupled to the cathode 33, and the anode lead 32 is coupled to the anode 34. Thereafter, the cathode 33 and the anode 34 are stacked on each other with the separator 35 interposed therebetween. Thereafter, the cathode 33, the anode 34, and the separator 35 are spirally wound to form a spirally-wound body. Thereafter, the protective tape 37 is attached to a surface of the spirally-wound body. Thereafter, the outer package member 40 is so folded as to sandwich the spirally-wound body. Thereafter, outer peripheral edges except for one side of the outer package member 40 are bonded to each other by using a thermal fusion bonding method, etc. to accommodate the spirally-wound body inside the pouch-shaped outer package member 40.

Thereafter, an electrolytic solution, a monomer as a raw material of a polymer compound, a polymerization initiator, and other materials such as a polymerization inhibitor as necessary are mixed. Thereafter, the mixture is stirred to prepare a composition for electrolyte. Thereafter, the composition for electrolyte is injected into the pouch-shaped outer package member 40. Thereafter, the outer package member 40 is sealed by a thermal fusion bonding method, etc. Lastly, the monomers are thermally polymerized to form a polymer compound. This causes the electrolytic solution to be held by the polymer compound. The electrolyte layer 36 is thereby formed. The spirally-wound electrode body 30 is thereby sealed inside the outer package member 40. As a result, the lithium ion secondary battery is completed.

[Third Procedure]

First, a spirally-wound body is fabricated by a procedure similar to the above-described second procedure except that the separator 35 in which the polymer compound layer is formed on the base layer is used. Thereafter, the spirally-wound body is accommodated inside the pouch-shaped outer package member 40. Thereafter, the electrolytic solution is injected into the outer package member 40. Thereafter, an opening of the outer package member 40 is sealed using a thermal fusion bonding method, etc. Lastly, the separator 35 is brought into adhesion with each of the cathode 33 and the anode 34 with the polymer compound layer interposed therebetween by heating the outer package member 40 while applying a weight to the outer package member 40. The polymer compound layer impregnated with the electrolytic solution is gelled thereby. The electrolyte layer 36 is thereby formed. The spirally-wound electrode body 30 is thereby sealed inside the outer package member 40. As a result, the lithium ion secondary battery is completed.

In the third procedure, it is more difficult for the lithium ion secondary battery to swell as compared with the first procedure. Further, in the third procedure, compared with the second procedure, it is more difficult for the solvent and the monomer (the raw material of the polymer compound) to remain in the electrolyte layer 36. Therefore, each of the cathode 33, the anode 34, and the separator 35 is sufficiently adhered to the electrolyte layer 36.

According to the lithium ion secondary battery of the laminated film type, the anode 34 contains the cyclic compound, i.e., one or more of the first cyclic compound, the second cyclic compound, and the third cyclic compound. Accordingly, it is possible to obtain a superior battery characteristic for a reason similar to that of the case described related to the lithium ion secondary battery of the cylindrical type.

It should be understood that other workings and effects of the laminated-film-type lithium ion secondary battery are similar to the other workings and effects of the cylindrical-type lithium ion secondary battery.

An application of the lithium ion secondary battery according to one embodiment of the present technology is as described below, for example. It should be understood that, since an application of the anode for a lithium ion secondary battery of the present technology is the same as the application of the lithium ion secondary battery, the application of the anode for a lithium ion secondary battery will be described together below.

The application of the lithium ion secondary battery is not particularly limited as long as it is a machine, a device, a tool, an apparatus, a system (an assembly of a plurality of devices and the like), or the like that is able to utilize the lithium ion secondary battery as a power source for driving, a power storage source for power accumulation, etc. The lithium ion secondary battery used as the power source may be a main power source or an auxiliary power source. The main power source is a power source which is preferentially used regardless of presence or absence of other power sources. The auxiliary power source may be, for example, a power source used instead of the main power source, or may be a power source switched from the main power source on an as-needed basis. In a case where the lithium ion secondary battery is used as the auxiliary power source, a type of the main power source is not limited to the lithium ion secondary battery.

The application of the lithium ion secondary battery is as follows, for example. It is an electronic apparatus (including a portable electronic apparatus) such as a video camera, a digital still camera, a mobile phone, a laptop personal computer, a cordless phone, a headphone stereo, a portable radio, a portable television, or a portable information terminal. It is a portable life appliance such as an electric shaver. It is a storage apparatus such as a backup power source or a memory card. It is an electric tool such as an electric drill or an electric saw. It is a battery pack to be mounted on a laptop personal computer, etc. as an attachable and detachable power source. It is a medical electronic apparatus such as a pacemaker or a hearing aid. It is an electric vehicle such as an electric automobile (including a hybrid automobile). It is an electric power storage system such as a household battery system that stores electric power in preparation for an emergency. It is needless to say that the application of the lithium ion secondary battery may be another application other than the applications described above.

Working examples according an embodiment of the present technology are described below.
1. Fabrication of Lithium Ion Secondary Battery
2. Evaluation of Lithium Ion Secondary Battery
3. Discussion
4. Conclusion As described below, after a test lithium ion secondary battery was manufactured, battery characteristics of the lithium ion secondary battery were evaluated.

Figure 5:
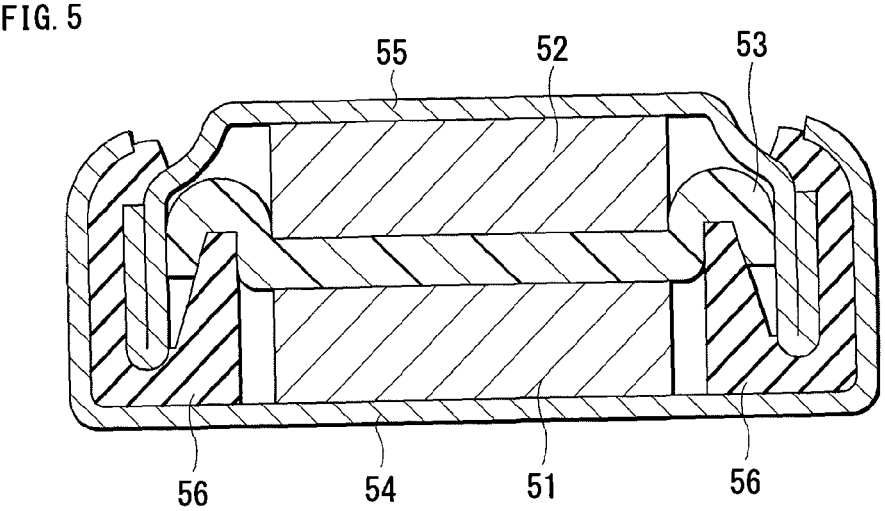
FIG. 5 is a cross-sectional view of a configuration of a test secondary battery (coin type) according to an embodiment of the present technology.

FIG. 5 illustrates a cross-sectional configuration of the test secondary battery. The secondary battery is a coin-type lithium ion secondary battery in which a test electrode 51 and a counter electrode 52 are stacked on each other with a separator 53 interposed therebetween, and an outer package can 54 accommodating the test electrode 51 and an outer package cup 55 accommodating the counter electrode 52 are attached to each other by being swaged with a gasket 56.

In a case of fabricating the test electrode 51, first, 95 parts by mass of an anode active material and 5 parts by mass of an anode binder (polyvinylidene fluoride) were mixed to obtain an anode mixture. Thereafter, the anode mixture was put into an organic solvent (N-methyl-2-pyrrolidone). Thereafter, the organic solvent was stirred to obtain a paste-like anode mixture slurry. Thereafter, the anode mixture slurry was applied to both surfaces of an anode current collector (a copper foil, thickness=8 μm) using a coating apparatus. Thereafter, the anode mixture slurry was dried to form the anode active material layer. Lastly, the anode active material layer was compression-molded using a roll press machine.

As the anode active material, the cyclic compound, the carbon material, the metal-based material, and the other cyclic compounds were used. A type and a composition (a weight ratio) of the anode active material are as described in Tables 1 and 2.

As the cyclic compound, the first cyclic compound (the cyclic non-metallic coordination compound), the second cyclic compound (the crown-ether-type metal coordination compound), and the third cyclic compound (the azacrown-ether-type metal coordination compound) were used. A type of each of the cyclic non-metallic coordination compound, the crown-ether-type metal coordination compound, and the aza-crown-ether-type metal coordination compound is as described in Table 1.

Graphite (Gr) was used as the carbon material, and silicon (Si) and tin (Sn) were used as the metal-based material.

As the other cyclic compounds, the oxygen-containing cyclic compound (crown ether (CE) and cryptando (CRP)), the nitrogen-containing cyclic compound (cyclene (CYC)), and the oxygen-nitrogen-containing cyclic compound (4,10-diaza-12-crown 4-ether (DACE)) were used.

In this case, two types of anode active materials were mixed on an as-needed basis. A weight ratio in a case where the cyclic compound and the carbon material are used is a weight ratio of the cyclic compound to the cyclic compound and the carbon material. A weight ratio in a case where the cyclic compound and the metal-based material are used is a weight ratio of the cyclic compound to the cyclic compound and the metal-based material. A weight ratio in a case where the carbon material and the metal-based material are used is a weight ratio of the metal-based material to the carbon material and the metal-based material. A weight ratio in a case where the carbon material and the other cyclic compounds are used is a weight ratio of the other cyclic compounds to the carbon materials and the other cyclic compounds.

In a case of preparing the electrolytic solution, an electrolyte salt (lithium hexafluorophosphate) was added to a solvent (ethylene carbonate and diethyl carbonate). Thereafter, the solvent was stirred to dissolve the electrolyte salt. In this case, a mixture ratio (weight ratio) of the solvent was ethylene carbonate:diethyl carbonate=30:70, and a content of the electrolyte salt was 1 mol/kg with respect to the solvent.

In a case of assembling the secondary battery, the test electrode 51 was punched into a pellet shape. Thereafter, the cathode 51 was accommodated inside the outer package can 54. Thereafter, the counter electrode 52 (a lithium metal plate, thickness=100 μm) was punched out into a pellet shape. Thereafter, the counter electrode 52 was accommodated inside the outer package cup 55. Thereafter, the test electrode 51 accommodated inside the outer package can 54 and the counter electrode 52 accommodated inside the outer package cup 55 were stacked on each other with the separator 53 (a porous polyolefin film, thickness=23 μm) interposed therebetween. Thereafter, the outer package can 54 and the outer package cup 55 were attached to each other by being swaged with a gasket 56. As a result, a coin-type lithium ion secondary battery (a battery capacity=2.5 mAh) was completed.

Battery characteristics (a charge-discharge characteristic and an electrical resistance characteristic) of the lithium ion secondary battery were evaluated, and results described in Tables 1 and 2 were obtained.

In a case of examining the charge-discharge characteristic, first, a charge capacity (an initial charge capacity: mAh/g) of a first cycle was measured by charging the lithium ion secondary battery in an ambient temperature environment (temperature=25° C.). Thereafter, a discharge capacity (mAh/g) of the first cycle was measured by discharging the lithium ion secondary battery in the same environment.

Thereafter, a charge capacity (mAh/g) of a second cycle was measured by charging the lithium ion secondary battery in the same environment. Thereafter, a discharge capacity (mAh/g) of the second cycle was measured by discharging the lithium ion secondary battery in the same environment. Lastly, discharge efficiency (%) was calculated on the basis of a measurement result of the discharge capacity of the first cycle and a measurement result of the discharge capacity of the second cycle. The discharge efficiency is calculated by discharge efficiency (%)=(discharge capacity of second cycle/discharge capacity of first cycle)×100.

At the time of charging, constant current charge was performed at a current of 0.2 ItA until the voltage reached 0.05 V. Thereafter, constant voltage charge was performed at a voltage of 0.05 V until the current reached 0.01 ItA. At the time of discharging, constant current discharge was performed at a current of 0.2 ItA until the voltage reached 1.5 V. The value of 0.2 ItA is a current value at which the above-described battery capacity is completely discharged in five hours, and the value of 0.01 ItA is a current value at which the above-described battery capacity is completely discharged in hundred hours.

In a case of examining an electrical resistance characteristic, the lithium ion secondary battery was charged until a charging rate (SOC) reached 50% in an ambient temperature (temperature=25° C.). Thereafter, impedance (Ω) of the lithium ion secondary battery was measured by using an electrochemical measurement device (a multichannel electrochemical measurement system VPM3 available from Bio-Logic Science Instruments).

Charging conditions were similar to those in the case of examining the charge-discharge characteristic described above. Measurement conditions of impedance were a frequency range=1 MHz to 10 mHz, and an alternating-current amplitude (AC Amplitude)=10 mV. The impedance at frequency=10 Hz was thereby measured.

TABLE 1

| Experimental example | Anode active material | | | | | Initial charge capacity (mAh/g) | Discharge efficiency (%) |
| | Cyclic compound | Carbon material | Metal-based material | Other cyclic compound | Weight ratio | | |
| --- | --- | --- | --- | --- | --- | --- | --- |
| 1 | Formula (4-1) | Gr | — | — | 0.1 | 342.7 | 99.2 |
| 2 | Formula (4-2) | Gr | — | — | 0.1 | 323.9 | 99.3 |
| 3 | Formula (5-1) | — | — | — | — | 274.5 | 89.7 |
| 4 | Formula (5-1) | Gr | — | — | 0.1 | 533.8 | 98.9 |
| 5 | Formula (6-1) | — | — | — | — | 283.1 | 84.1 |
| 6 | Formula (6-1) | Gr | — | — | 0.1 | 518.8 | 97.9 |
| 7 | Formula (4-2) | — | Si | — | 0.1 | 1545.3 | 47.7 |
| 8 | Formula (5-1) | — | Si | — | 0.1 | 1573.1 | 43.2 |
| 9 | Formula (6-1) | — | Si | — | 0.1 | 1583.2 | 49.0 |
| 10 | Formula (4-2) | — | Sn | — | 0.1 | 645.7 | 92.3 |
| 11 | Formula (5-1) | — | Sn | — | 0.1 | 647.8 | 97.3 |
| 12 | Formula (6-1) | — | Sn | — | 0.1 | 651.9 | 91.5 |

TABLE 2

| Experimental example | Anode active material | | | | | Initial charge capacity (mAh/g) | Discharge efficiency (%) |
| --- | --- | --- | --- | --- | --- | --- | --- |
| | Cyclic compound | Carbon material | Metal-based material | Other cyclic compound | Weight ratio | | |
| 13 | — | Gr | — | — | — | 365.6 | 98.9 |
| 14 | — | — | Si | — | — | 1680.5 | 15.7 |
| 15 | — | — | Sn | — | — | 678.3 | 87.8 |
| 16 | — | Gr | Si | — | 0.1 | 633.9 | 71.6 |
| 17 | — | Gr | Si | — | 0.25 | 765.4 | 56.7 |
| 18 | — | Gr | — | CE | 0.1 | 337.9 | 96.5 |
| 19 | — | Gr | — | CRP | 0.1 | 314.5 | 97.2 |
| 20 | — | Gr | — | CYC | 0.1 | 325.6 | 94.9 |
| 21 | — | Gr | — | DACE | 0.1 | 326.5 | 93.9 |

A relationship between the configuration of the anode active material and the battery characteristics (the charge-discharge characteristic and the electrical resistance characteristic) is described below with reference to Tables 1 and 2.

In the case where the cyclic compound was used as the anode active material (Experimental examples 3 and 5), a high initial charge capacity of up to about 300 mAh/g was obtained while the impedance was suppressed to the 20% level, and high discharge efficiency of up to 80% or more was also obtained.

Such a tendency was also obtained in the case where the carbon material and the metal-based material were used together with the cyclic compound as the anode active materials (Experimental examples 1, 2, 4, and 6 to 12). More specifically, in the case where the carbon material and the metal-based material were used together with the cyclic compound as the anode active materials (1, 2, 4, and 6 to 12), an initial charge capacity, discharge efficiency, and impedance were obtained to be almost equivalent to those in the case where only the carbon material and the metal-based material were used as the anode active materials (Experimental examples 13 to 16).

It should be understood that, in the case where the cyclic compound was used as the anode active material (Experimental examples 1, 2, 4, and 6 to 12), one or more of the initial charge capacity, the discharge efficiency, and the impedance were improved as compared with those in the case where other cyclic compound was used as the anode active material (Experimental examples 18 to 21).

From the above, when the anode contained the cyclic compound, the charge-discharge characteristic was improved while the electrical resistance characteristic was secured. One reason for this is considered to be that lithium ions were smoothly and sufficiently inserted and extracted at the times of charge and discharge by the cyclic compound serving as the anode active material, and expansion and contraction of the test electrode 51 were sufficiently suppressed by the cyclic compound at the times of charge and discharge. Therefore, superior battery characteristics were obtained in the lithium ion secondary battery.

Although the present technology has been described above with reference to the embodiment and working examples, modes of the present technology are not limited to the modes described in the embodiment and the working examples, and are therefore modifiable in a variety of ways. Specifically, although the description has been given of the cylindrical-type lithium ion secondary battery, the laminated-film-type lithium ion secondary battery, and the coin-type lithium ion secondary battery, these are non-limiting. For example, it may be another lithium ion secondary battery such as a rectangular-type lithium ion secondary battery.

Further, although the case where the battery device to be used in the lithium ion secondary battery has the spirally-wound structure has been described, this is non-limiting. For example, the battery device may have another structure such as a laminated structure.

It should be understood that the effects described in the present description are mere examples, and the effects of the present technology are therefore not limited to the effects described in the present description. Accordingly, other effects may be obtained related to the present technology.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention claimed is:

1. A lithium ion secondary battery comprising:

a cathode;

an anode including a cyclic compound, wherein the cyclic compound includes one or more of a first cyclic compound represented by the following formula (1), a second cyclic compound represented by the following formula (2), and a third cyclic compound represented by the following formula (3); and an electrolytic solution,

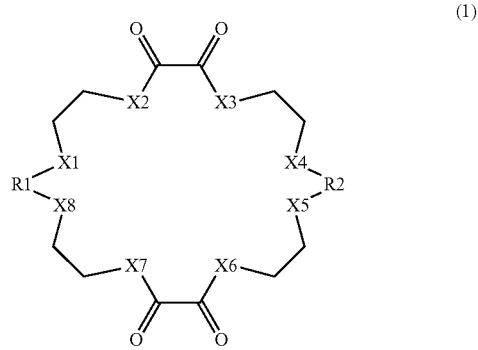

(1)

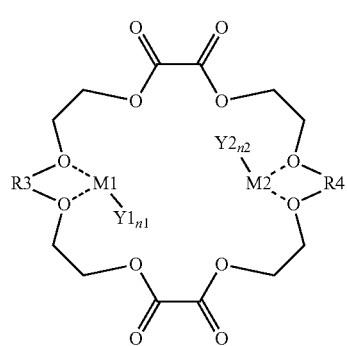

(2)

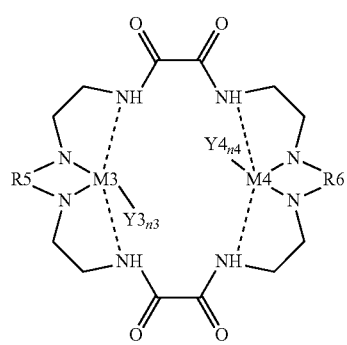

(3)

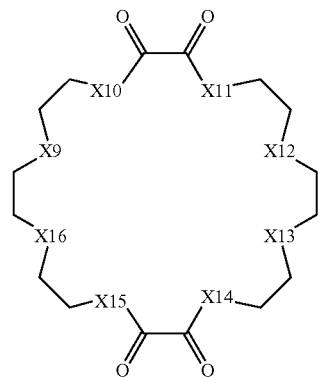

(4)

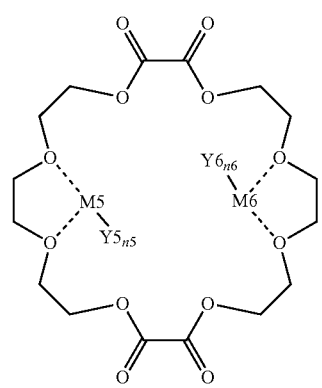

(5)

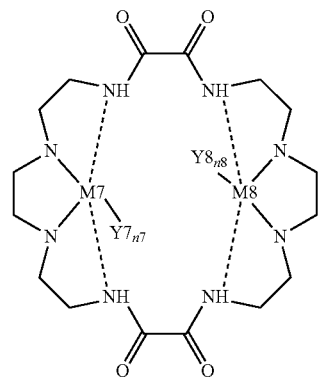

(6)

wherein each of X1 to X8 includes one of an oxo group (—O—) and an imino group (—NH—), each of R1 to R6 includes one of an ethylene group (—CH$_2$—CH$_2$—) and a dicarbonyl group (—C(=O)—C(=O)—), each of M1 to M4 includes a metal element, each of Y1 to Y4 includes a halogen element and each of n1 to n4 is an integer.

2. The lithium ion secondary battery according to claim 1, wherein each of the M1 to the M4 includes one of tin (Sn), titanium (Ti), silicon (Si), copper (Cu), manganese (Mn), iron (Fe), niobium (Nb), nickel (Ni), cobalt (Co), aluminum (Al), and zirconium (Zr).

3. The lithium ion secondary battery according to claim 1, wherein each of the Y1 to the Y4 includes one of fluorine (F), chlorine (Cl), bromine (Br), and iodine (I).

4. The lithium ion secondary battery according to claim 1, wherein all of the X1 to the X8 include oxo groups or imino groups.

5. The lithium ion secondary battery according to claim 1, wherein
the first cyclic compound is a compound represented by formula (4),
the second cyclic compound is a compound represented by formula (5), and
the third cyclic compound is a compound represented by formula (6), wherein each of X9 to X16 includes one of an oxo group and an imino group, each of M5 to M8 includes a metal element, each of Y5 to Y8 includes a halogen element, and each of n5 to n8 is an integer.

6. The lithium ion secondary battery according to claim 1, wherein
the anode further includes a carbon material, a metal-based material, or both, and
a weight ratio of the cyclic compound to the cyclic compound, the carbon material, and the metal-based material is 0.01 or more and 0.99 or less.

7. An anode for a lithium ion secondary battery, comprising a cyclic compound,
wherein the cyclic compound includes one or more of a first cyclic compound represented by the following formula (1), a second cyclic compound represented by the following formula (2), and a third cyclic compound represented by the following formula (3),

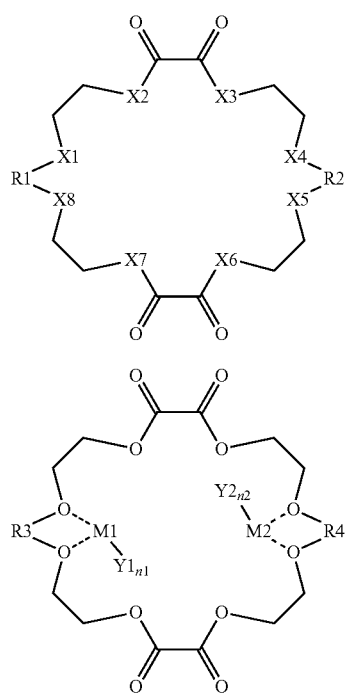
(1)
(2)
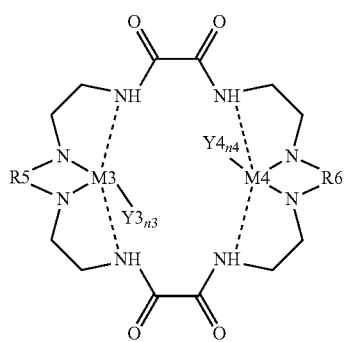
(3)
wherein each of X1 to X8 includes one of an oxo group (—O—) and an imino group (—NH—), each of R1 to R6 includes one of an ethylene group (—CH$_2$—CH$_2$—) and a dicarbonyl group (—C(=O)—C(=O)—), each of M1 to M4 includes a metal element, and each of Y1 to Y4 includes a halogen element, and each of n1 to n4 is an integer.
* * * * *